United States Patent
Renaudin et al.

[11] Patent Number: 6,071,460
[45] Date of Patent: Jun. 6, 2000

[54] METHOD OF MANUFACTURING A GOLF SHAFT OF COMPLEX SHAPE BY INTERNAL BLADDER PRESSURIZATION

[75] Inventors: Jean Pierre Renaudin, Encinitas; Philippe Renard, Carlsbad, both of Calif.

[73] Assignee: Taylor Made Golf Company Inc., Carlsbad, Calif.

[21] Appl. No.: 08/911,813

[22] Filed: Aug. 15, 1997

Related U.S. Application Data

[60] Provisional application No. 60/058,094, Jun. 2, 1997.

[51] Int. Cl.⁷ .................................................. B29C 49/00
[52] U.S. Cl. ........................... 264/314; 264/257; 425/389
[58] Field of Search .................... 264/313, 314, 264/257, 516, DIG. 50, 258, 219; 425/389

[56] References Cited

U.S. PATENT DOCUMENTS

| | | | |
|---|---|---|---|
| 1,168,390 | 1/1916 | Goldsmith | 425/389 |
| 2,446,281 | 8/1948 | Harding | 18/19 |
| 2,766,806 | 10/1956 | Rothermel et al. | 154/8 |
| 2,782,803 | 2/1957 | Rothermel et al. | 138/56 |
| 2,826,784 | 3/1958 | Pratt | 425/389 |
| 2,999,780 | 9/1961 | Perrault | 264/314 |
| 3,194,705 | 7/1965 | Caplan | 156/143 |
| 3,258,384 | 6/1966 | Scott | 264/314 |
| 3,290,728 | 12/1966 | Pratt | 425/389 |
| 3,458,611 | 7/1969 | Roberts | 254/314 |
| 4,187,271 | 2/1980 | Rolston et al. | 264/258 |
| 4,252,760 | 2/1981 | Foster et al. | 264/314 |
| 4,266,750 | 5/1981 | Gallizia | 249/65 |
| 4,338,070 | 7/1982 | Nava | 425/112 |
| 5,071,506 | 12/1991 | Nelson et al. | 156/441 |
| 5,318,742 | 6/1994 | You | 264/314 |
| 5,534,203 | 7/1996 | Nelson et al. | 264/313 |
| 5,755,826 | 5/1998 | Beach et al. | 264/257 |
| 5,795,524 | 8/1998 | Basso, Jr. et al. | 264/257 |
| 5,814,268 | 9/1998 | Banchelin et al. | 264/314 |

FOREIGN PATENT DOCUMENTS

| | | | |
|---|---|---|---|
| 891588 | 1/1972 | Canada | 425/389 |
| 0242161 | 10/1987 | European Pat. Off. | 264/314 |
| 1459565 | 12/1965 | France | 425/389 |
| 0034870 | 3/1978 | Japan | 264/314 |
| 1243956 | 7/1986 | U.S.S.R. | 425/389 |
| 2066144 | 7/1981 | United Kingdom | 264/314 |
| 2250466 | 10/1992 | United Kingdom . | |

*Primary Examiner*—Jan H. Silbaugh
*Assistant Examiner*—Stefan Staicovici
*Attorney, Agent, or Firm*—Knobbe, Martens, Olson & Bear, LLP

[57] ABSTRACT

An improved apparatus for manufacturing a reinforced golf club shaft having a complex shape. An inflatable bladder is positioned over a mandrel having a simple shape. Layers of fiber material are then rolled over inflatable bladder to produce a sub-assembly. The sub-assembly is placed in a mold defining a negative of the shape of the final shaft that is to be produced. The impression may have enlarged or narrowed regions for producing irregularities in the shape of the shaft. The bladder is expanded within the mold so that the composite structure is radially displaced and compressed between the bladder and the mold. The inflatable bladder has a variable thickness that conforms to the shape of the impression so that the composite structure undergoes a uniform and minimum displacement along its entire length, which improves the mechanical properties of the final shaft.

10 Claims, 20 Drawing Sheets

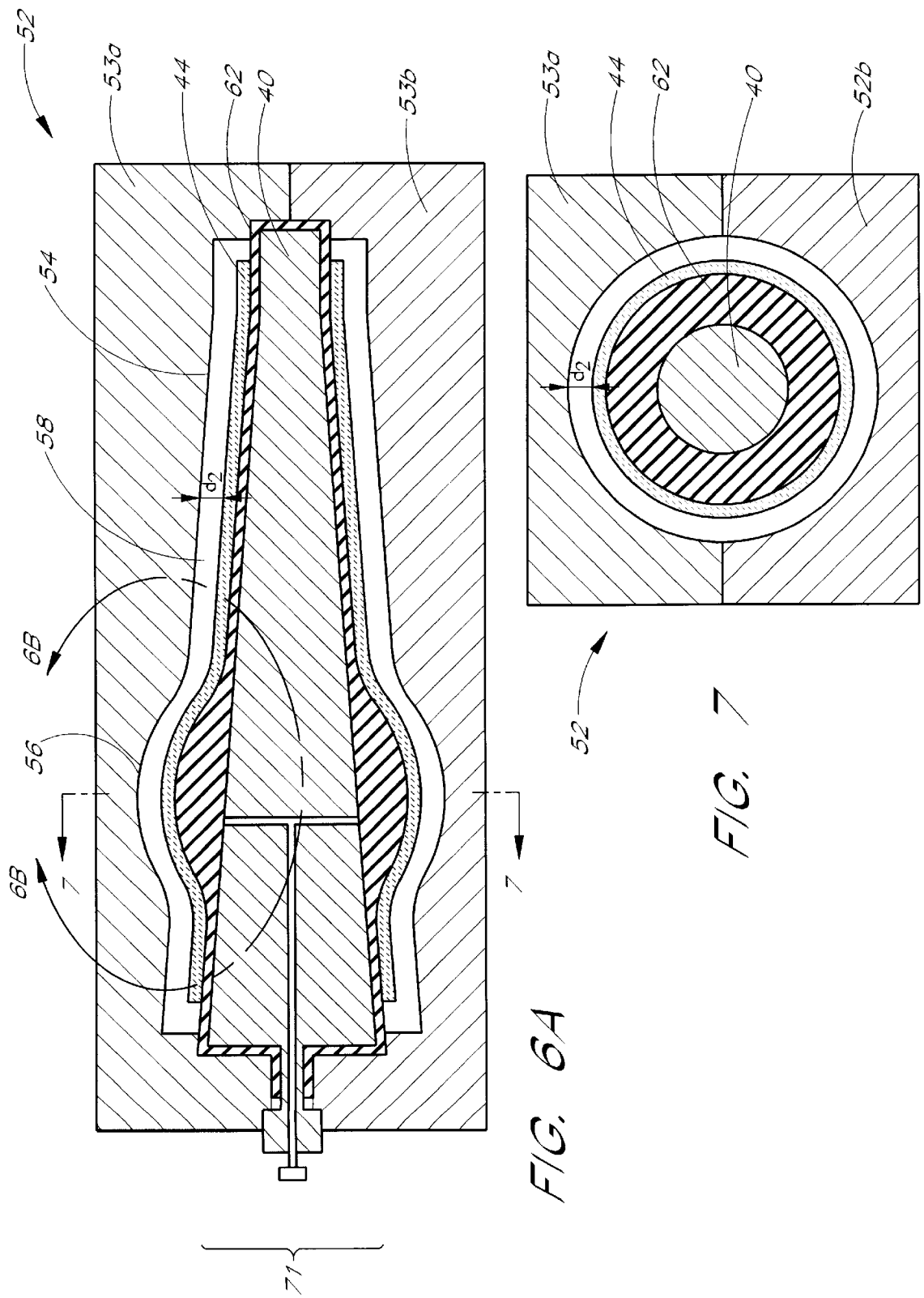

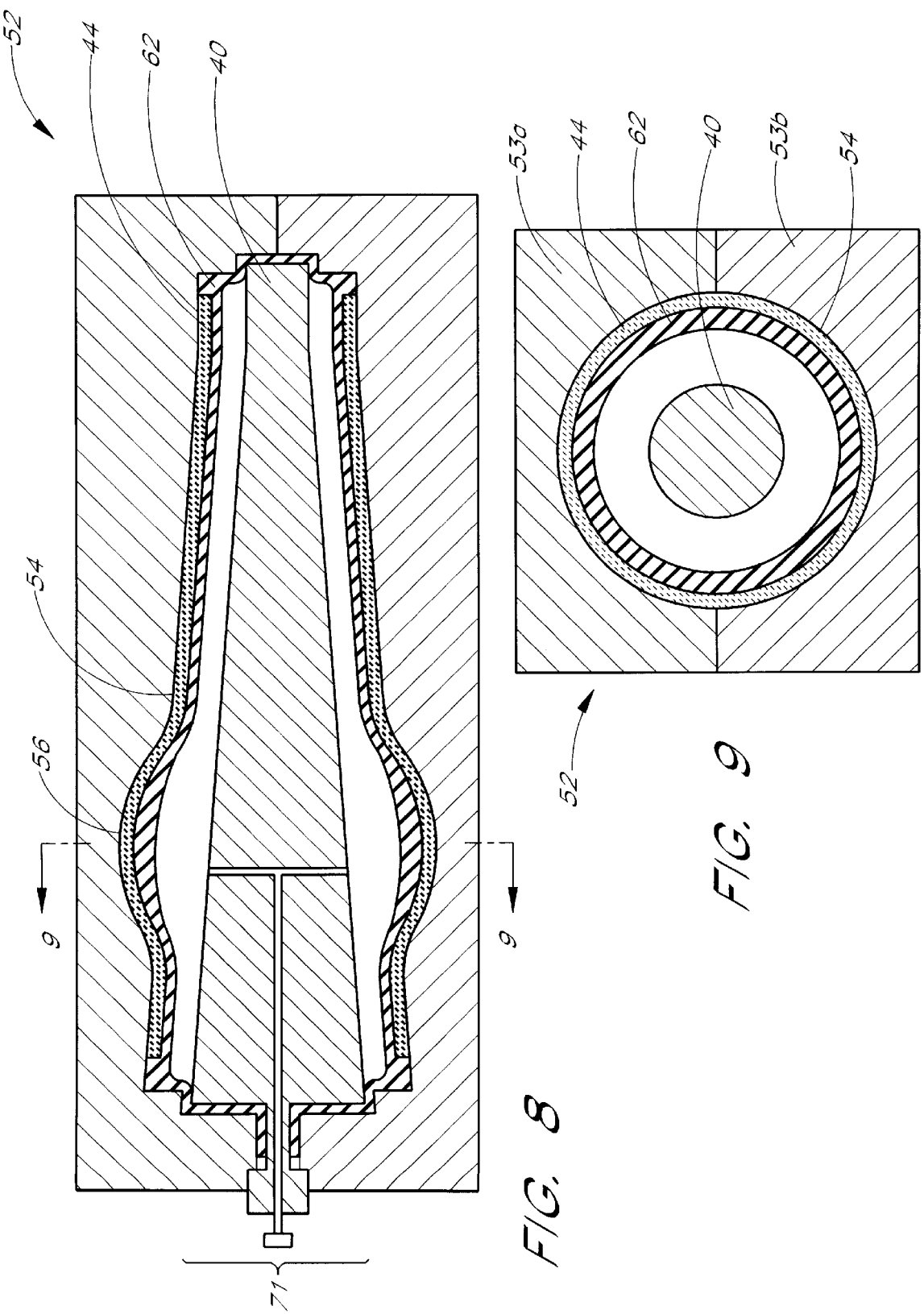

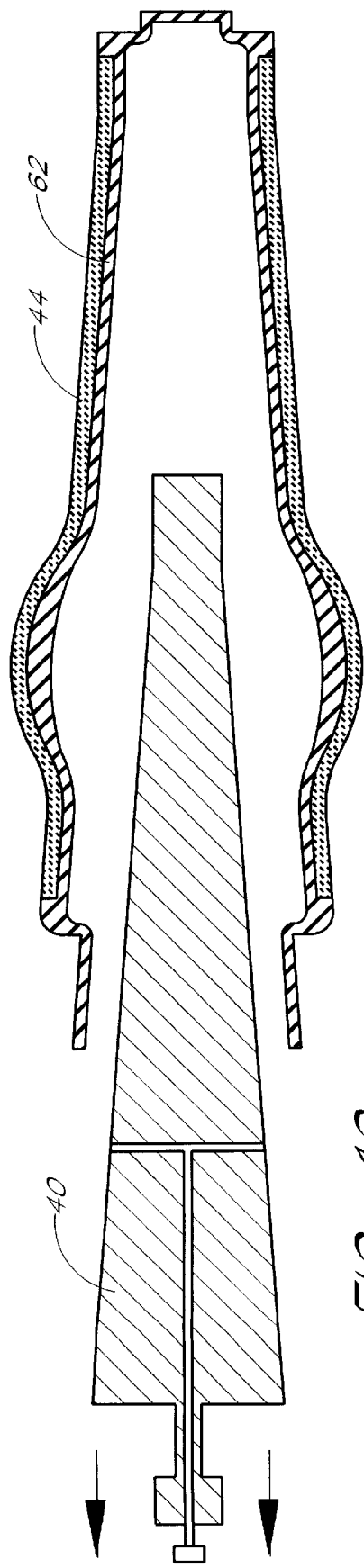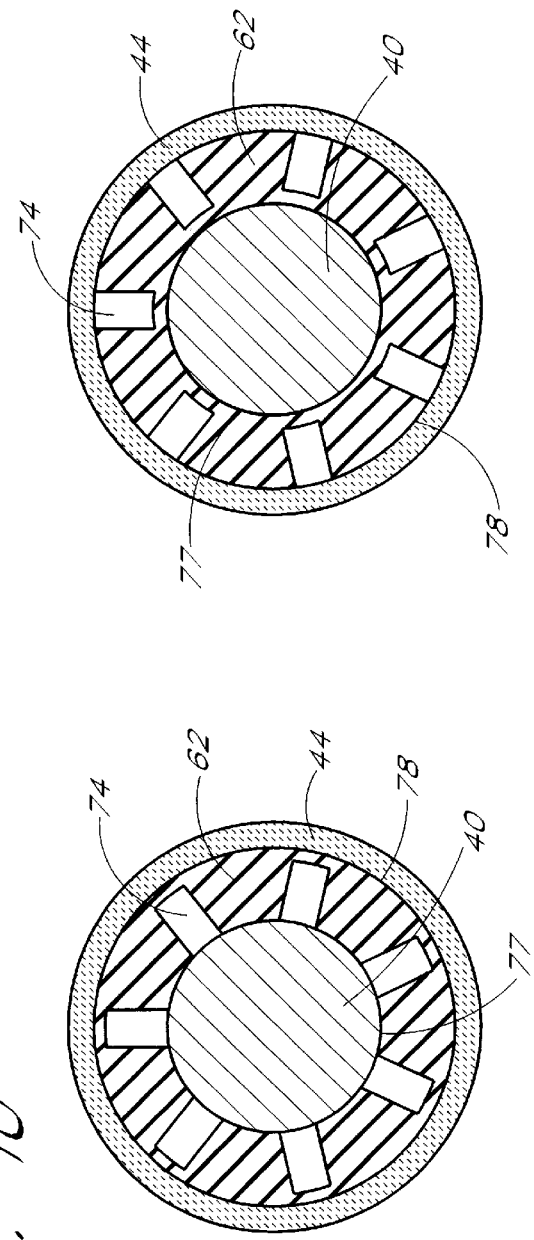
FIG. 10
FIG. 11
FIG. 12

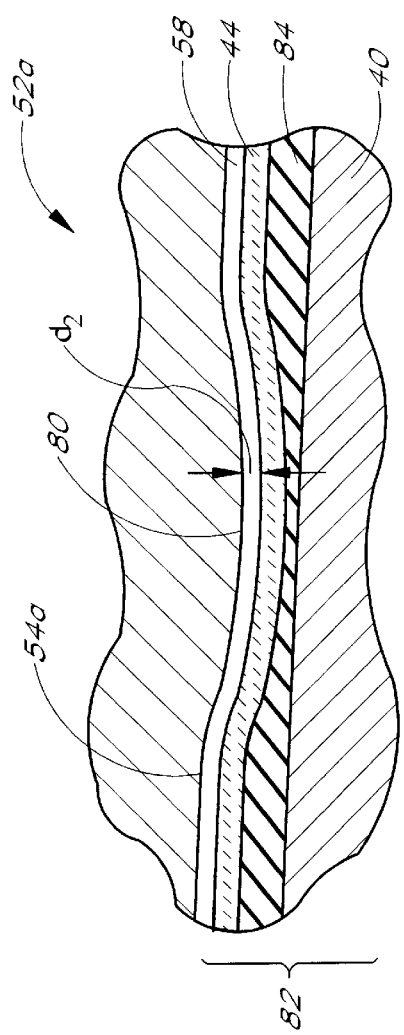
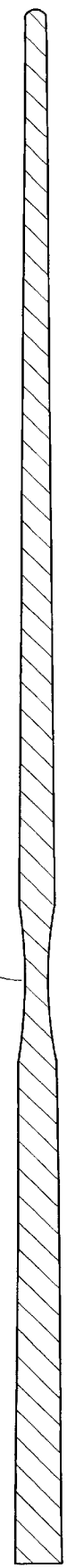
FIG. 14
FIG. 13

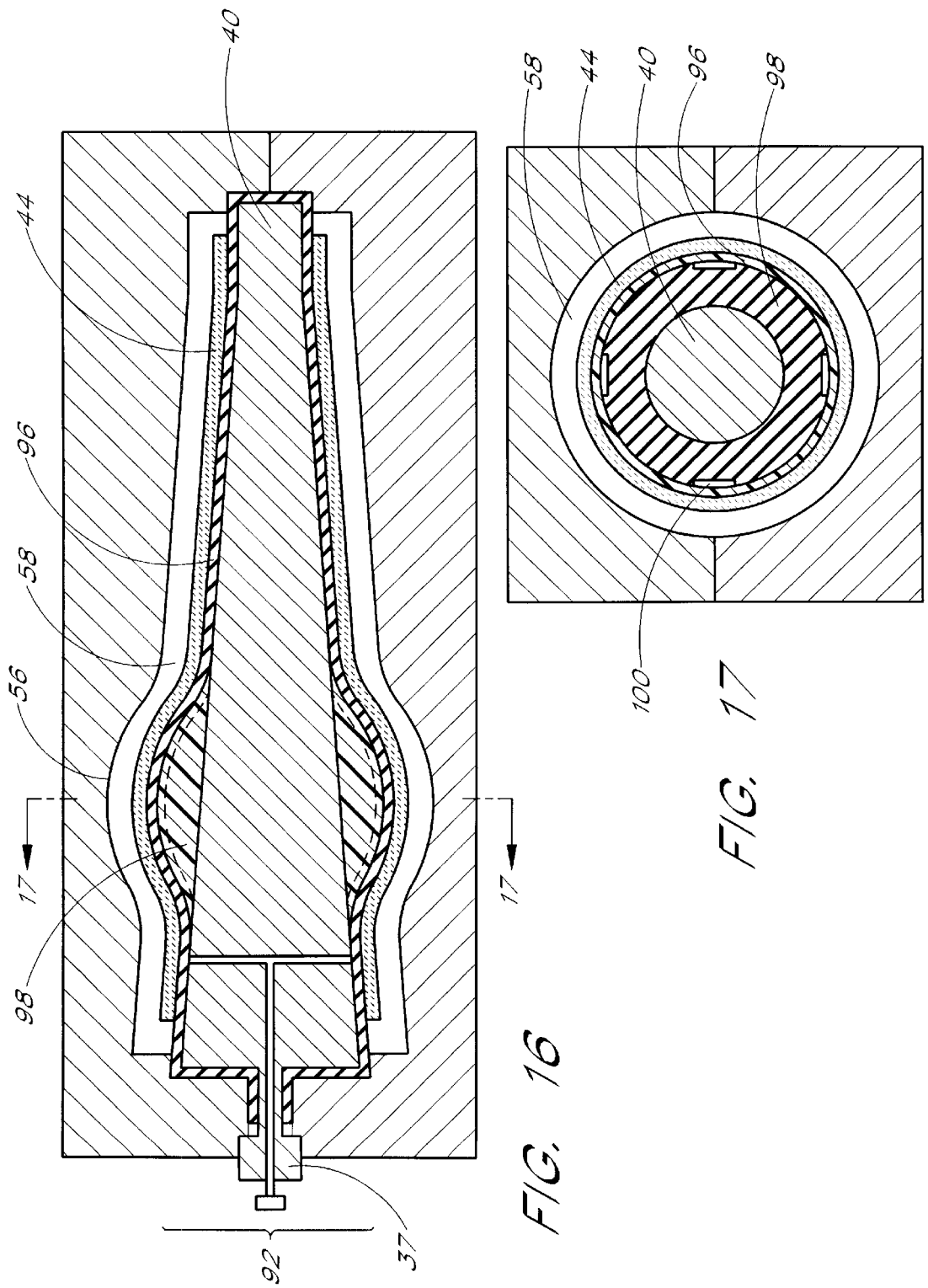

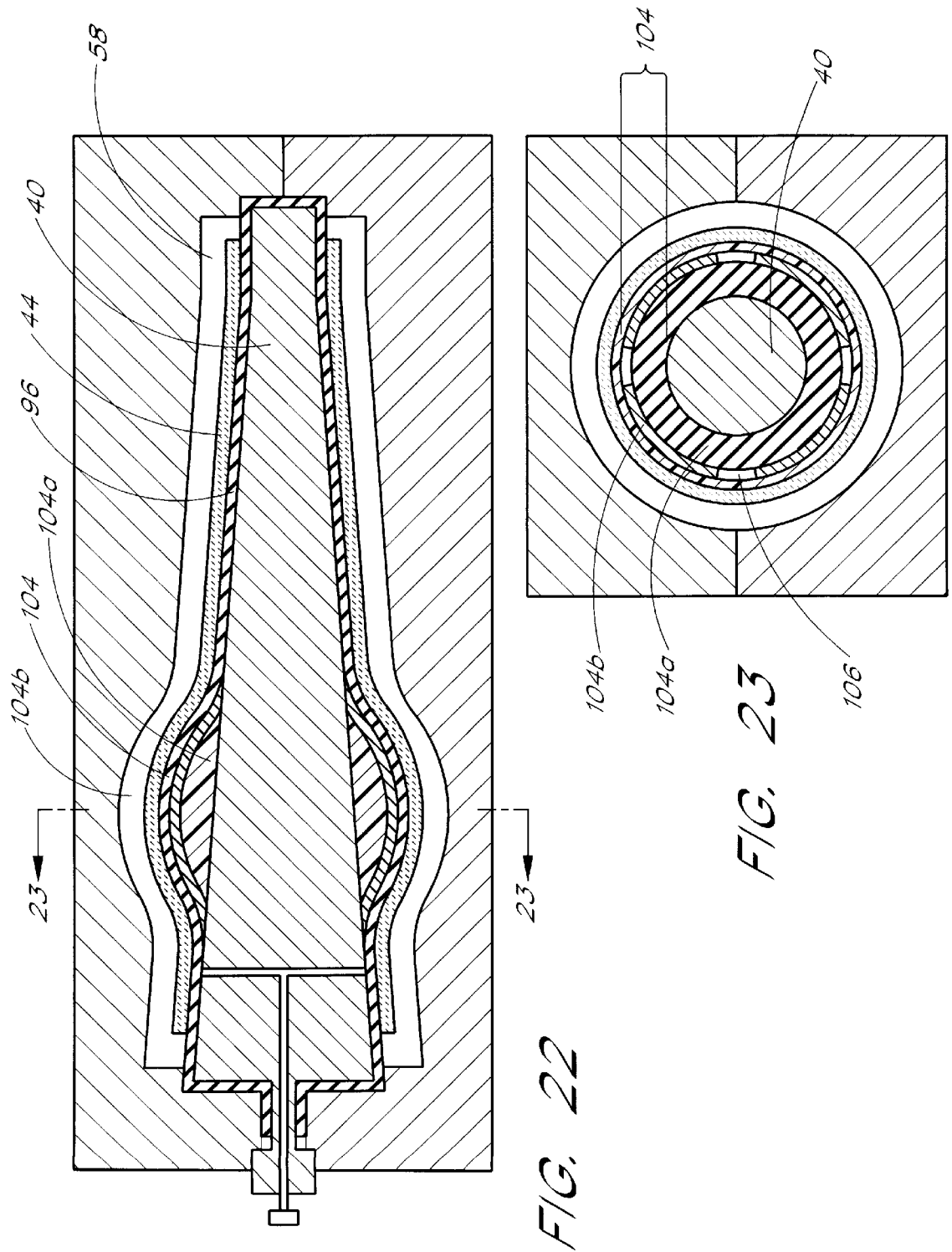

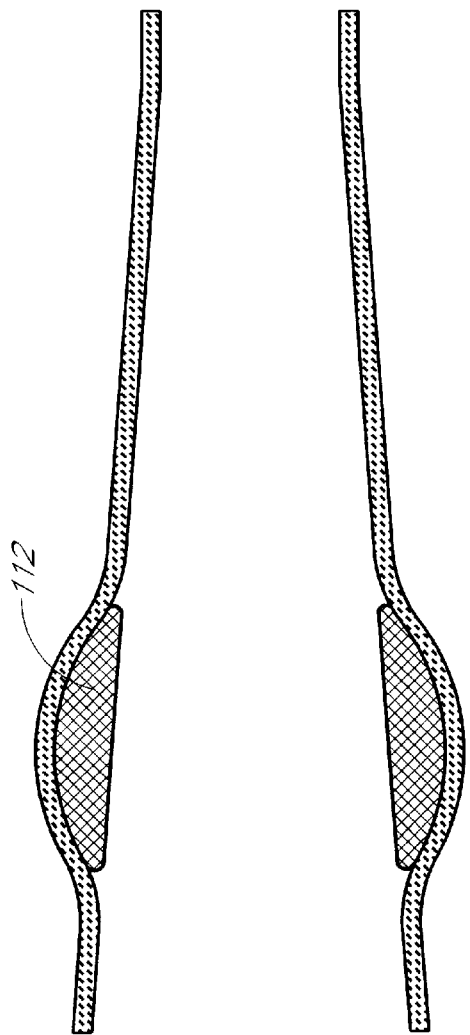
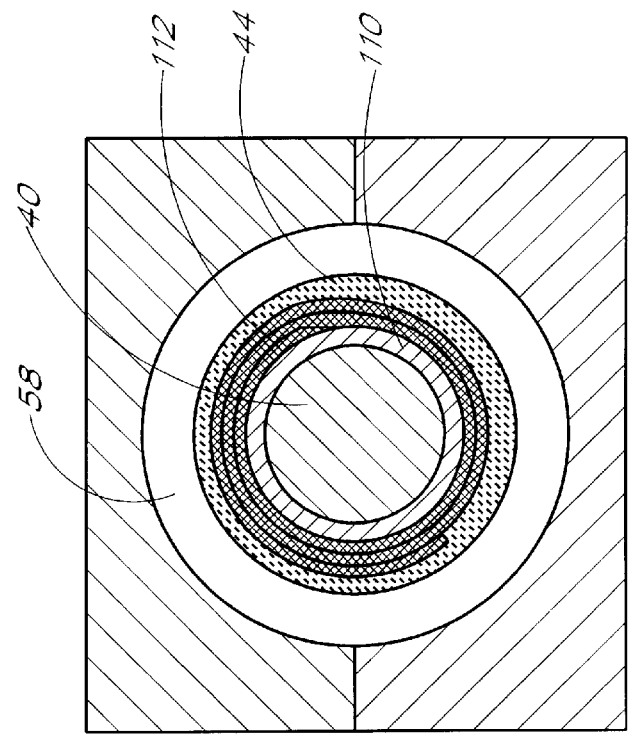
FIG. 28
FIG. 29

METHOD OF MANUFACTURING A GOLF SHAFT OF COMPLEX SHAPE BY INTERNAL BLADDER PRESSURIZATION

BACKGROUND AND SUMMARY OF THE INVENTION

This application claims the benefit of U.S. Provisional Application No. 60/058,094, filed Jun. 2, 1997.

FIELD OF THE INVENTION

The present invention relates to an apparatus and method for manufacturing a reinforced golf club shaft having a complex shape. More particularly, the present invention relates to a device and method for manufacturing a golf club shaft having an enlarged or narrowed portion positioned locally along the length of the shaft.

DESCRIPTION OF THE RELATED ART AND SUMMARY OF THE INVENTION

Golf clubs having shafts that are made of low graphite or other high performance and low density fibers are very popular. These types of golf club shafts provide lightweight clubs that are easier to swing and have higher strength properties than traditional steel shafts. Graphite club shafts also have better damping properties than the traditional steel shafts to provide a softer feel when the user swings the club.

The traditional process for manufacturing fiber reinforced resin shafts consists of dressing a mandrel with an uncured fiber-reinforced composite structure. A ribbon of thermoshrinkable polyester film is then wrapped around the composite structure and the mandrel is placed in an oven. The oven is heated, which causes the film to shrink and compress the composite structure around the mandrel. The heat provided by the oven also causes the fiber-reinforced structure to cure and conform to the shape of the mandrel. After cooling, the film is removed from the cured composite structure and the mandrel is removed leaving a golf club shaft. A grinding process is then performed to polish the surface of the shaft.

Unfortunately, this traditional method of manufacturing fiber-reinforced resin shafts presents many drawbacks. One such drawback is that the compaction provided by the thermoshrinkable film is not optimal in that it can vary as a function of various parameters, including the shape of the shaft, the diameter and thickness of the shaft, and the type of fiber material that is used. The compaction pressure provided by the shrink tape is typically on the order of approximately 10–30 psi, which is too low to sufficiently compact the fibers. Furthermore, this traditional process cannot be used to manufacture shafts having complex shapes (i.e., having irregularities, such as enlarged or narrowed regions, along the length of the shaft), as the irregularities make it difficult to remove the mandrel from the compacted structure. Polishing such complex shapes is also difficult to control and often leads to the removal of fiber materials from the composite structure. Consequently, the mechanical characteristics of the shaft, such as stiffness and strength, may be altered and can vary significantly from one shaft to another.

United Kingdom Patent Application No. 2,250,466 describes a more appropriate process to manufacture golf shafts having complex shapes. The process involves the steps of arranging a flexible, inflatable thin bladder around a rigid mandrel having a substantially conical shape, then dressing the mandrel with layers of fiber sheets to obtain a substantially frusto-conical composite structure. The structure is then placed in a mold defining an internal impression that conforms to the shape of the shaft, including an enlarged or narrowed portion. A gap exists in the impression between the composite structure and the surface of the impression. A molded shaft is produced by first heating the mold, which produces a radiant heat on the composite structure through the gap. The heat causes the composite structure to soften. An internal pressure is then applied to the bladder so that the bladder inflates and causes the composite structure to expand through the gap. The bladder compresses the softened composite structure against the inner surface of the impression. The molded shaft is then cooled and removed from the mold. The bladder is preferably manufactured by dipping a template having the same shape as the mandrel in a liquid bath of elastomer, such as latex, to produce a bladder of constant thin thickness that conforms precisely to the shape of the mandrel.

The process disclosed in U.K. Patent Application No. 2,250,466 produces shafts that may have a greater range of complex shapes than may be produced by the traditional method described above. This is because during the manufacturing process, the molded structure expands outwardly rather than being compressed around a mandrel, which facilitates removal of the mandrel after the shaft has been molded. Moreover, because the external surface of the fiber resin is in direct contact with the impression of the female mold, a smooth surface is created in the final molded shaft so that the grinding or finishing step is not necessary. This process also provides a higher pressure of compaction than in the traditional shrink-tape process. The bladder pressure is on the order of 6 to 15 bars.

On the other hand, the method described in U.K. Patent Application No. 2,250,466 is not optimal for the production of golf shafts having complex shapes that include local portions of enlargement or narrowing. It has been observed by the applicant that the fiber reinforced resin structure is less compacted and, therefore, less dense in the sections of the shaft that require a large expansion, such as in the enlarged portion of the shaft. Furthermore, the enlarged or narrow portions of the mold impression create a significant differential in the gap size along the length of the shaft. Consequently, the composite structure experiences a larger expansion in the areas of large gap distance, resulting in a loss of mechanical properties of the composite structure. Moreover, since the areas of large expansion experience a lower compaction during the molding process, this results in a poor finish of the external surface of the molded shaft.

An additional drawback is associated with the softening of the composite material. As discussed, the composite material is softened by heat that radiates across the gap from the heated female mold. The composite structure softens faster in the smaller areas of the gap so that the rate of softening of the composite structure differs along its length. The pressurization step must occur as soon as the composite material reaches the transitional glass temperature of the resin. If the pressurization is delayed to allow time for the larger gap regions to soften, then the lower gap regions have already begun to harden when pressurization occurs. Consequently, the differential in gap size prevents a homogeneous and constant softened state of the resin along the full length of the shaft to be produced.

Furthermore, the pressure of molding cannot exceed a certain limit of roughly twenty bars, even if the shaft comprises zones of large expansion. If the pressure exceeds this limit, a significant part of the resin is "wringed" toward both ends of the shaft. This adversely affects the mechanical characteristics of the shaft, such as a 2 to 3 percent weight loss in the resin.

The gap between the outer surface of the uncured composite structure and the surface of the mold impression therefore plays a fundamental role in the fiber compaction and exterior finish of the final cured shaft. In particular, where the gap size is greater, the outward displacement of the fibers of the composite structure during the molding process is also greater. This results in the fibers having a slightly bent final configuration that leads to weakened zones in comparison to the substantially straight final configuration of the fibers that experience a lesser outward displacement.

There is therefore a need for an improved device and method for manufacturing golf club shafts having complex shapes that include enlarged or narrowed portions along the length of the shaft. The method of manufacturing such golf club shafts should produce shafts having proper mechanical properties and a suitable finished surface. The method should preferably reduce the required displacement that the composite structure must undergo to produce enlarged or narrowed portions of the shaft, while still allowing a mandrel to be easily removed after molding.

One aspect of the invention relates to a method of manufacturing a golf club shaft having an irregular final shape. The method involves the steps of arranging an elongated inflatable bladder around a mandrel having a globally tapered configuration so as to form a composite structure having a shape proportional to the final shape of the golf shaft, the bladder having a nonconstant thickness along the length of the mandrel, positioning an uncured fiber reinforced plastic material around the bladder so that the material generally conforms to the shape of the structure, positioning the structure and the material in a female mold which defines an negative of the irregular shape, compressing the material so that the material presses against the female mold to take on the irregular final shape, and curing the structure.

Desirably the structure and the material is positioned in the mold such that there is an axial distance between the material and the mold surface and the axial distance does not exceed a predetermined range. Desirably, the compressing step further comprises pressing the fibers along the inter diameter of the structure outward an amount roughly equal to the predetermined range. Preferably, the structure is compressed outward an amount less than or equal to 0.7 mm.

The material is advantageously expanded outward by inflating the bladder. Preferably, an additional step comprises depressurizing the bladder and axially removing the golf club shaft from the bladder.

Another aspect of the invention relates to a method of forming a golf shaft, comprising the steps of arranging a bladder around a mandrel having a globally tapered configuration, wrapping around the bladder a preimpregnated fiber reinforced resin material having a substantially uniform thickness to form an uncured rolled composite structure, positioning the uncured composite structure in a female mold which incorporates at least a local portion forming one of a projection and a recess so that the material and the female mold form an axial gap having a substantially constant size therebetween, pressurizing the bladder to expand the material, and curing the resin of the material to form the final shape of the shaft while maintaining pressure in the bladder.

In a preferred embodiment, the bladder has a local portion having a decreased thickness. A further step desirably comprises arranging the bladder around the mandrel and positioning the composite structure in the female mold such that the local portion of the bladder is positioned radially inward from the local portion of the female mold. Desirably, the method further comprises positioning the uncured composite structure in the female mold such that the axial gap is less than or equal to 0.7 mm along substantially the entire length of the material.

Yet another aspect of the invention involves an assembly for manufacturing a golf club shaft. The assembly comprises a female mold having an internal surface defining a cavity, a mandrel defining an external surface, and a bladder positioned over the surface of the mandrel. The bladder and the mandrel are sized and shaped so that a material supported by an external surface of the bladder is insertable into the cavity during a molding process. The bladder includes at least one area of localized irregularity defining one of a projection formed by a portion having an increased thickness and a recess formed by a portion having a decreased thickness. The external surface of the bladder and the internal surface of the mold define a radial gap no larger than a predetermined distance when the bladder and the mandrel are positioned within the mold. In a preferred embodiment, the bladder defines a thickness which varies between approximately 0.4 to 2 mm and comprises a silicon substance.

Desirably, the predetermined distance is selected so that a radial gap between the internal surface of the female mold and an external surface of a material supported by the external surface of the bladder is no more than 0.7 mm along the length of the material. The assembly advantageously comprises an uncured fiber reinforced plastic material supported by the external surface of the bladder. A radial gap between the internal surface of the female mold and an external surface of the material is preferably no more than 0.7 mm along the length of the material.

Another aspect of the invention relates to a bladder for use with a mandrel and a female mold having an internal surface defining a cavity and at least one area of localized irregularity defining one of a projection and a recess to manufacture a golf club shaft. The bladder comprises a resilient body having a globally tapered configuration defining an internal surface sized and shaped to be positionable over an external surface of a mandrel. The bladder includes at least one area of localized irregularity defining one of a projection formed by a portion having an increased thickness and a recess formed by a portion having a decreased thickness. The localized irregularity of the bladder is located on the body so as to be positionable radially adjacent to the area of localized irregularity of the female mold. In a preferred embodiment, the area of localized irregularity of the bladder defines a projection formed by a portion having an increased thickness.

Yet another aspect of the invention is a shaft for a golf club having an elongate body having a butt end and a tip end. The body defines an area of irregularity and the shaft comprises a composite fiber reinforced plastic composite material having a substantially constant density.

BRIEF DESCRIPTION OF THE DRAWINGS

These and other features of the invention will now be described with reference to the drawings of a preferred embodiment, which are intended to illustrate and not to limit the invention, and in which:

FIG. 6A is a longitudinal sectional side view of the molding operation of a golf shaft during the positioning of the uncured composite structure within a mold in accordance with a preferred embodiment of the present invention;

FIG. 7 is a cross-sectional view taken along 7—7 of FIG. 6A;

FIG. 8 is a sectional side view of the molding operation shown in FIG. 6A after inflation of a bladder in a closed mold according to a preferred embodiment of the present invention;

FIG. 9 is a cross-sectional view taken along 9—9 of FIG. 8;

FIG. 10 is a longitudinal sectional side view of the operation of removing a mandrel from a molded composite structure;

FIG. 11 illustrates a cross-section of a molded subassembly including a mandrel, a bladder and an uncured composite structure according to an alternative embodiment of the present invention;

FIG. 12 illustrates a cross-sectional view of the subassembly of FIG. 11;

FIG. 13 illustrates a side view of a golf shaft having a narrowed portion;

FIG. 14 illustrates a sectional side longitudinal view of the molding operation of the shaft of FIG. 13 after inflation of a bladder in a closed mold according to an alternative embodiment of the present invention;

FIG. 16 is a side sectional view illustrating the molding operation of a golf shaft during the positioning of the uncured composite structure within the mold in accordance with another embodiment of the invention;

FIG. 17 is a cross-sectional view taken along 17—17 of FIG. 16;

FIG. 22 is a side sectional view illustrating the molding operation of a golf shaft during the positioning of the uncured composite structure within the mold in accordance with yet another embodiment of the invention;

FIG. 23 is a cross-sectional view taken along 23—23 of FIG. 22;

FIG. 28 is a longitudinal view of the mold structure of FIG. 27 after the mandrel and bladder have been removed;

FIG. 29 is a cross-sectional view taken alone 29—29 of FIG. 26;

DETAILED DESCRIPTION OF THE PREFERRED EMBODIMENT

Figure 1:
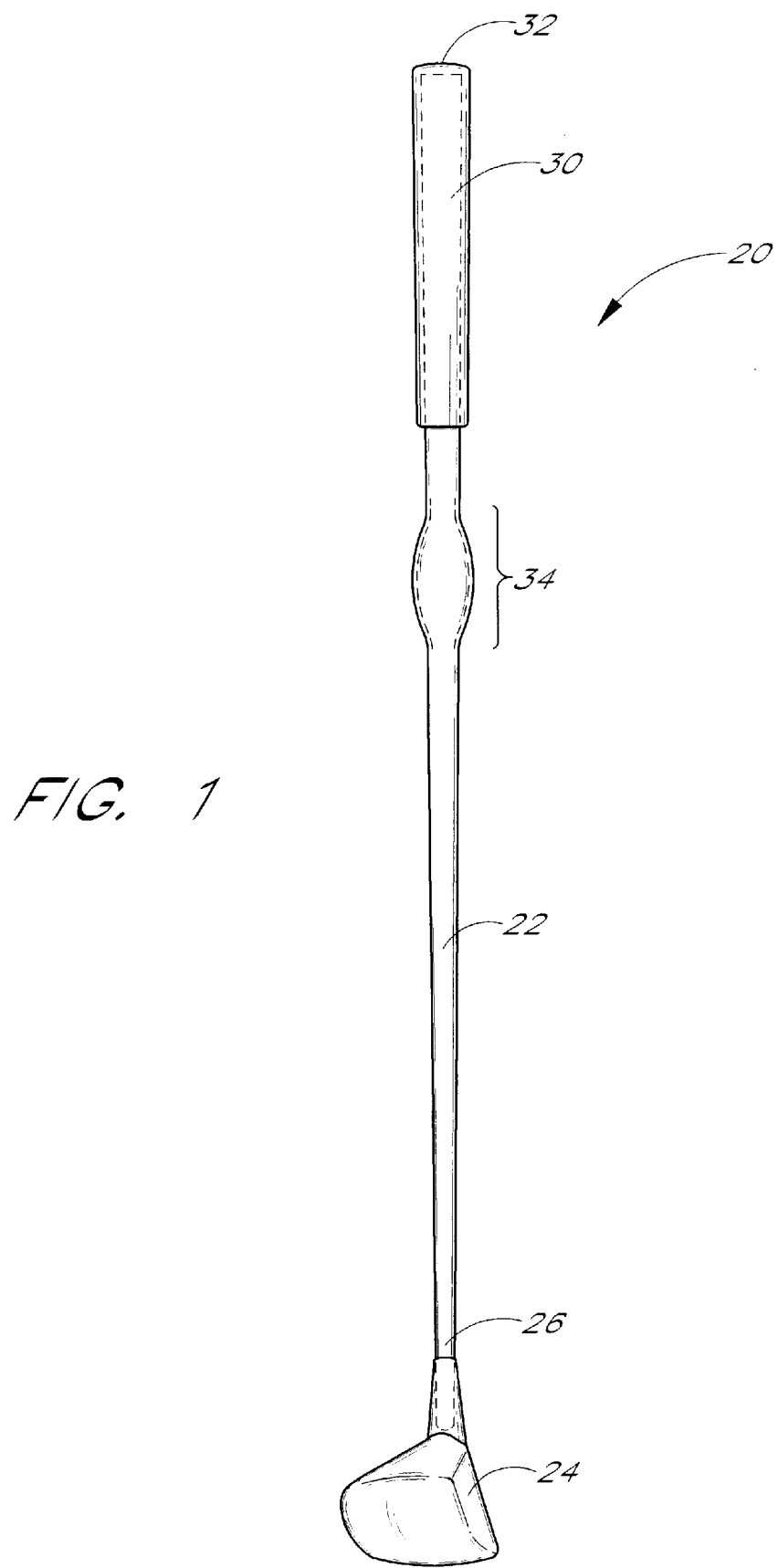
FIG. 1 is a perspective view illustrating a golf club having a shaft that includes an area of local enlargement that has been molded in accordance with the present invention.

FIG. 1 illustrates a golf club 20 manufactured in accordance with the present invention. The golf club 20 has a shaft 22 and a head 24 that is mounted on a tip end 26 of the shaft 22 in a well known manner. A handle 30 is mounted on a butt end 32 of the shaft 22. The shaft 22 is preferably hollow and is manufactured of a material having a specific thickness as shown by the dashed lines in FIG. 1.

The shaft 22 has a generally cylindrical shape that tapers in size along its length so that the butt end 32 has a larger cross-sectional size than the tip end 26. Preferably, the length-wise distribution of the cross-sectional size and shape of the shaft 22 is selected to achieve certain stiffness and deformation characteristics. For instance, the shaft 22 may have an enlarged portion 34 that extends along a portion of the shaft's length. The enlarged portion 34 is preferably configured to impart certain mechanical and physical characteristics to the shaft 22. The enlarged portion 34 can be formed at various locations along the length of the shaft 22 and can have various sizes and shapes that result in a desired specific deformation profile for the shaft 22. The size and shape of the enlarged portion 34 may also be selected to provide a desired weight distribution over the shaft 22 without adding any additional weight and while maintaining the preferred mechanical stiffness distribution and resistance characteristics.

The preferred embodiment of the shaft 22 is manufactured of a composite material consisting of layers of individual fiber sheets that are molded and cured, as described below. Preferably, a first step of preparation (not shown) consists of producing a flat lay-up of several fiber sheets, each of them having a specific size and fiber orientation depending upon the desired characteristic of torque and flex to be obtained. The thickness of the shaft 22 is dependant oil the number of layers of fiber sheets that are piled atop each other during the preparation of the lay-up. Thereafter, the lay-up is rolled around the bladder. Although discrete fiber sheets can be added in various locations, this adds weight and stiffness. Accordingly, the bulged shape of the enlarged portion 34 is preferably not obtained only by increasing the number of fiber sheets. Rather, the enlarged portion 34 is created by the expansion of a substantially continuous fiber sheet using a method of internal pressure molding, as described below.

As shown by the dotted lines in FIG. 1, the interior surface of the enlarged portion 34 is contoured to substantially conform to the shape of the external surface of the enlarged portion 34. Hence, the thickness of the shaft 22 remains approximately constant along the entire length of the shaft, even along the enlarged portion 34.

As discussed above, the traditional shrink-tape method of manufacturing golf club shafts does not work well to manufacture shafts having complex shapes of the type shown in FIG. 1. This is because the mandrel used in the shrink tape method cannot be easily pulled from the molded fiber structure due to the variations in shape along the shaft length.

Figures 2, 3:
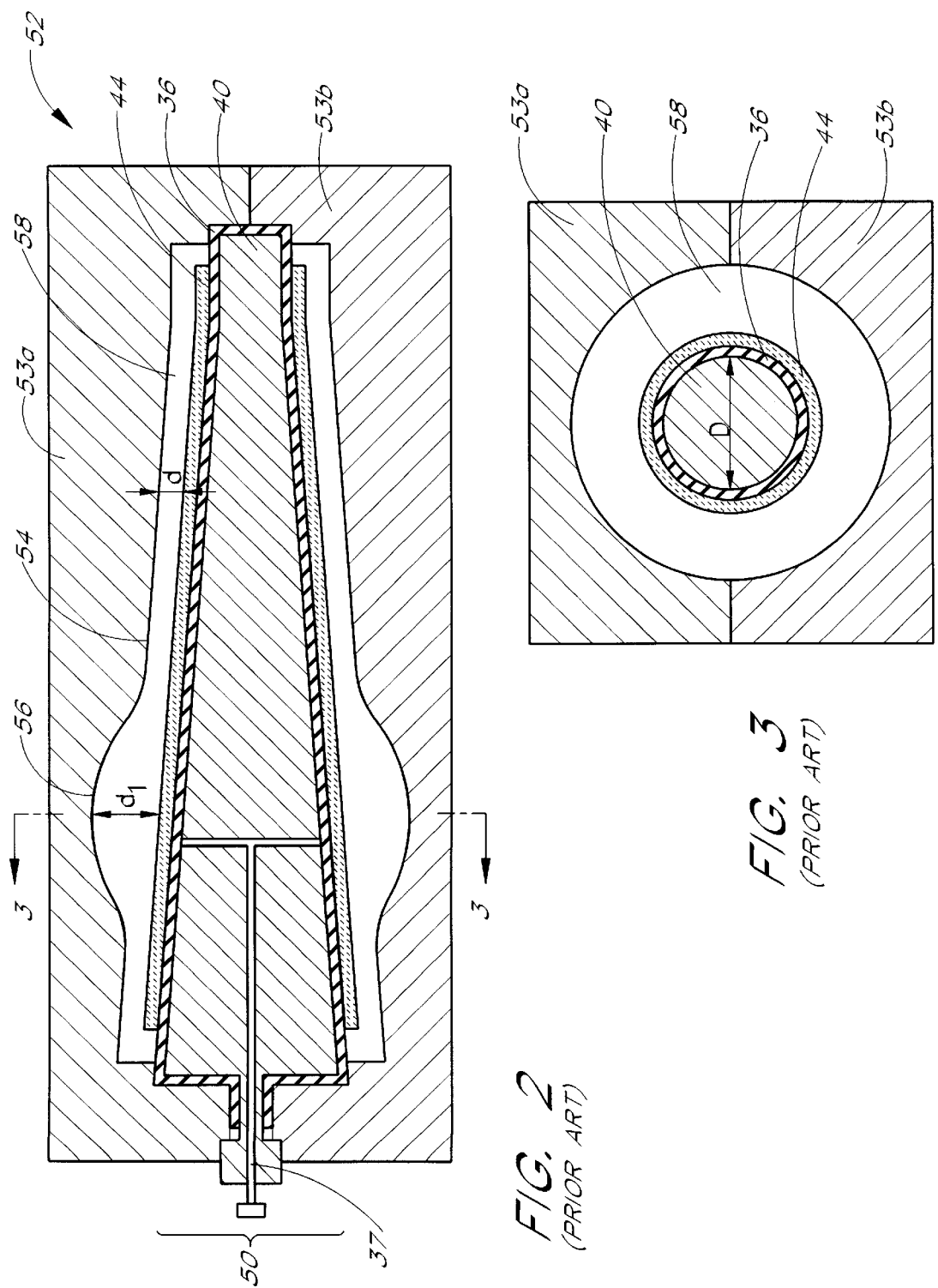
FIG. 2 is a side sectional view illustrating the molding operation of a golf club shaft during the positioning of the uncured composite structure within a mold according to the prior art.
FIG. 3 is a cross-sectional view taken along 3—3 of FIG. 2.

FIGS. 2–5 illustrate the method of U.K Patent Application No. 2,250,466 for manufacturing golf club shafts 22 having complex shapes. Referring to FIGS. 2 and 3, a first step of the prior art method involves placing an inflatable bladder 36 over a rigid mandrel 40. As shown, the mandrel 40 has a cylindrical shape with a diameter D that uniformly decreases in size from one end of the mandrel 40 to the other end. The bladder 36 has an internal shape that substantially conforms to the shape of the mandrel 40 so that the bladder 36 fits snug on the mandrel 40. The bladder 36 has an open end that may be connected to a fluid source (not shown) for inflation of the bladder 36 through a fluid channel 37.

Layers of fiber sheets impregnated with a thermnosetting resin are rolled over the mandrel 40 to obtain an uncured rolled composite structure 44. The bladder 36, the mandrel 40, and the composite structure 44 are collectively referred to as a sub-assembly 50.

As shown in FIG. 2, the sub-assembly 50 is positioned within a female mold 52 consisting of two separate parts 53a and 53b that may be separated to facilitate the positioning of the sub-assembly 50 inside the mold 52. A hollow impression 54 is formed within the female mold 52. The impression 54 defines a shape that corresponds to the final external shape of the shaft that is to be produced. The impression 54 therefore includes an enlarged section 56 having a bulge-like shape. During the molding process, the enlarged section 56 for the enlarged portion 34 of the shaft 22 (FIG. 1).

As shown in FIGS. 2 and 3, the volume of the sub-assembly 50 is smaller than the volume of the impression 54 before the bladder 36 is inflated. A gap 58 is thus formed between the outer surface of the composite structure 44 and the surface of the impression 54. The size of the gap 58 may be defined by a radial distance d between the outer surface of the composite structure 44 and the surface of the impression 54. As best shown in FIG. 2, the radial distance d varies along the length of the sub-assembly 50 with a maximum radial distance $d_1$ occurring at the enlarged section 56. The distance $d_1$ can be on the order of approximately 1 mm to 2.5 mm.

As discussed, a fluid source is used to apply a pressurized fluid to the interior of the bladder 36 to cause the bladder 36 to inflate. As the bladder 36 expands within the gap 58, it causes the composite structure 44 to also expand and conform to the shape of the impression 54. The composite structure undergoes a radial expansion distance d, corresponding to the size of the gap 58.

Figures 4, 5:
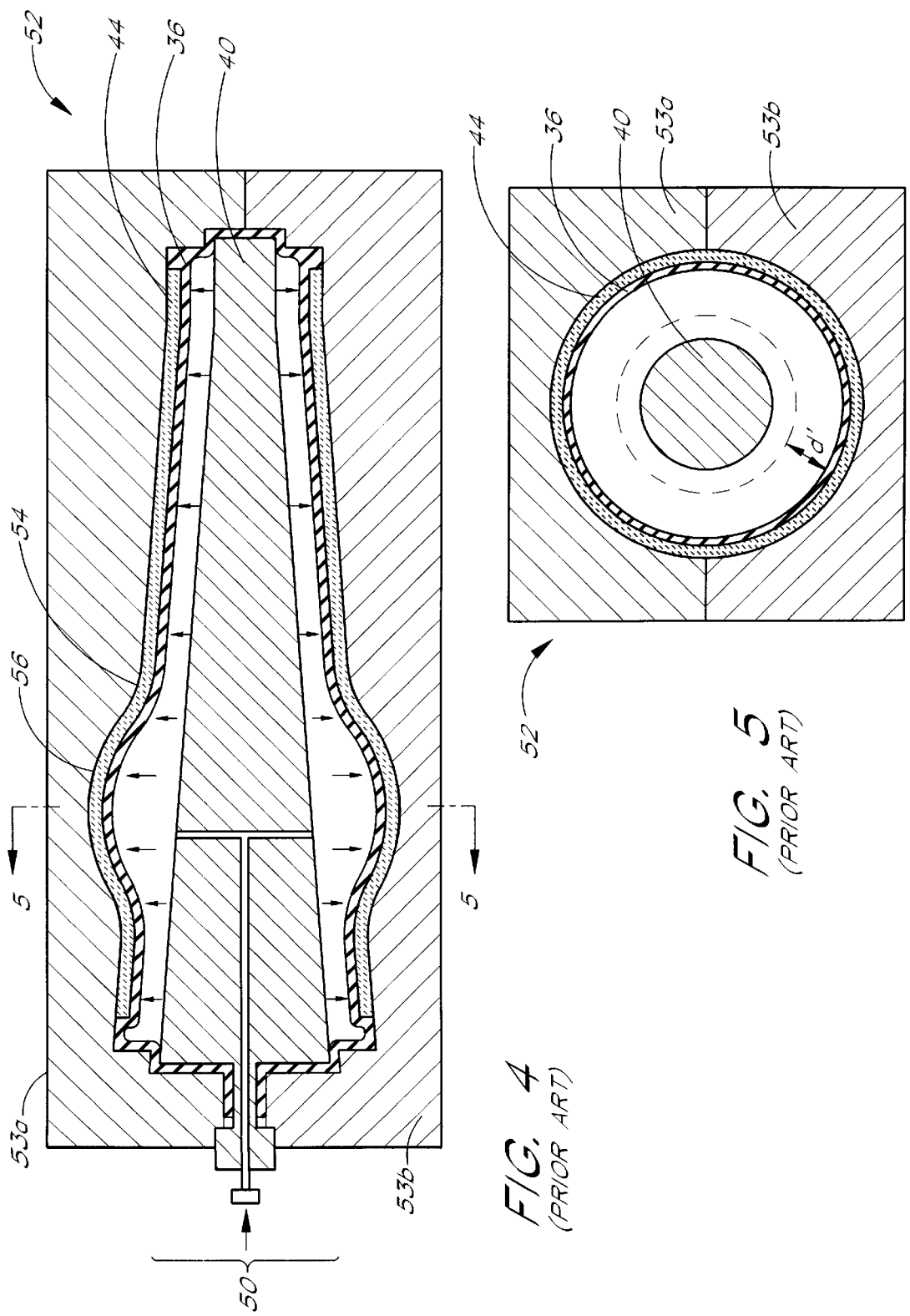
FIG. 4 is a longitudinal sectional side view of the molding operation shown in FIG. 2 after inflation of a bladder in a closed mold according to the prior art.
FIG. 5 is a cross-sectional view taken along 5—5 of FIG. 4.

FIGS. 4 and 5 show the sub-assembly 50 after the expansion process has occurred. As shown, the bladder 36 compresses the composite structure 44 between the bladder 36 and the surface of the impression 54. The compaction pressure causes the composite structure 44 to conform to the shape of the impression 54. Heat is applied to the mold 52 during this step so that the composite structure 44 cures.

FIG. 5 illustrates a cross-sectional view of the sub-assembly 50 with an expanded bladder 36. The dashed lines represent the original shape of the deflated bladder 36, prior to expansion. After expansion of the bladder 36, the outer-most fiber sheet in the composite structure 44 abuts the surface of the impression 54 and the innermost fiber sheet in the composite structure 44 abuts the bladder 36. Hence, during expansion the outermost fiber sheet undergoes a radial displacement d, which varies along the length of the mandrel, particularly at the enlarged section 56. The innermost fiber sheet undergoes a displacement d'. Generally, d is less than d' because the compaction process reduces the thickness of the composite structure 44.

During expansion, the composite structure 44 experiences a greater radial displacement along the portion of the impression 54 that comprises the enlarged section 56. The maximum radial displacement experienced by the composite structure 44 is $d_1$, which occurs at the largest section of the enlarged section 56. Hence, different sections of the composite structure 44 experience different radial displacements. The variances in the radial displacement experienced by the composite structure during the expansion step adversely affects the mechanical properties of the final shaft, as the fiber compaction is less dense in the areas of larger expansion. Furthermore, the fibers that experience a larger expansion are bent with respect to the other fibers in the composite structure, which leads to weakened zones along the length of the final shaft. Hence, the mechanical properties of a shaft produced according to U.K. Patent Application No. 2,250,466 may vary along the shaft's length. This is undesirable.

FIGS. 6A–9 illustrate an improved apparatus and method for manufacturing a golf shaft 22 having a complex shape in accordance with a preferred embodiment of the present invention. Like reference numerals will be used for like parts of the prior art and the preferred embodiment for ease of understanding. As described below, the preferred embodiment eliminates the variations in radial displacement that the composite structure experiences during the expansion step of the molding process. The preferred embodiment therefore provides golf shafts of complex shapes with optimized mechanical features along the entire length of the shaft.

As shown in FIGS. 6A and 7, a bladder 62 is placed over a rigid mandrel 40. The mandrel 40 is generally cylindrical shape with a cross-sectional shape that tapers along its length. Layers of fiber sheets impregnated with a thermosetting resin are rolled over the bladder 62 to form an uncured composite structure 44. The mandrel 40, bladder 62, and composite structure 40 are collectively referred to as sub-assembly 71. As shown in FIGS. 6A and 7, the sub-assembly 71 is positioned within a mold 52 that consists of two pieces 53a and 53b. The mold 52 defines an internal impression 54 that includes an enlarged section 56, as described above with respect to the prior art embodiment. The shape of the impression 54 preferably conforms to the shape of the final golf club shaft.

In FIGS. 6A and 7, the bladder 62 is deflated so that a gap 58 exists between the outer surface of the composite structure 44 and the surface of the impression 54. The size of the gap 58 may be defined by a radial distance $d_2$ between the outer surface of the composite structure 44 and the surface of the impression 54. In accordance with the present invention, the gap size $d_2$ preferably remains substantially constant along the entire length of the sub-assembly 71, as described below. In a preferred embodiment, the gap size is maintained less than or equal to 0.7 mm along the entire length of the sub-assembly 71.

Figure 6B:
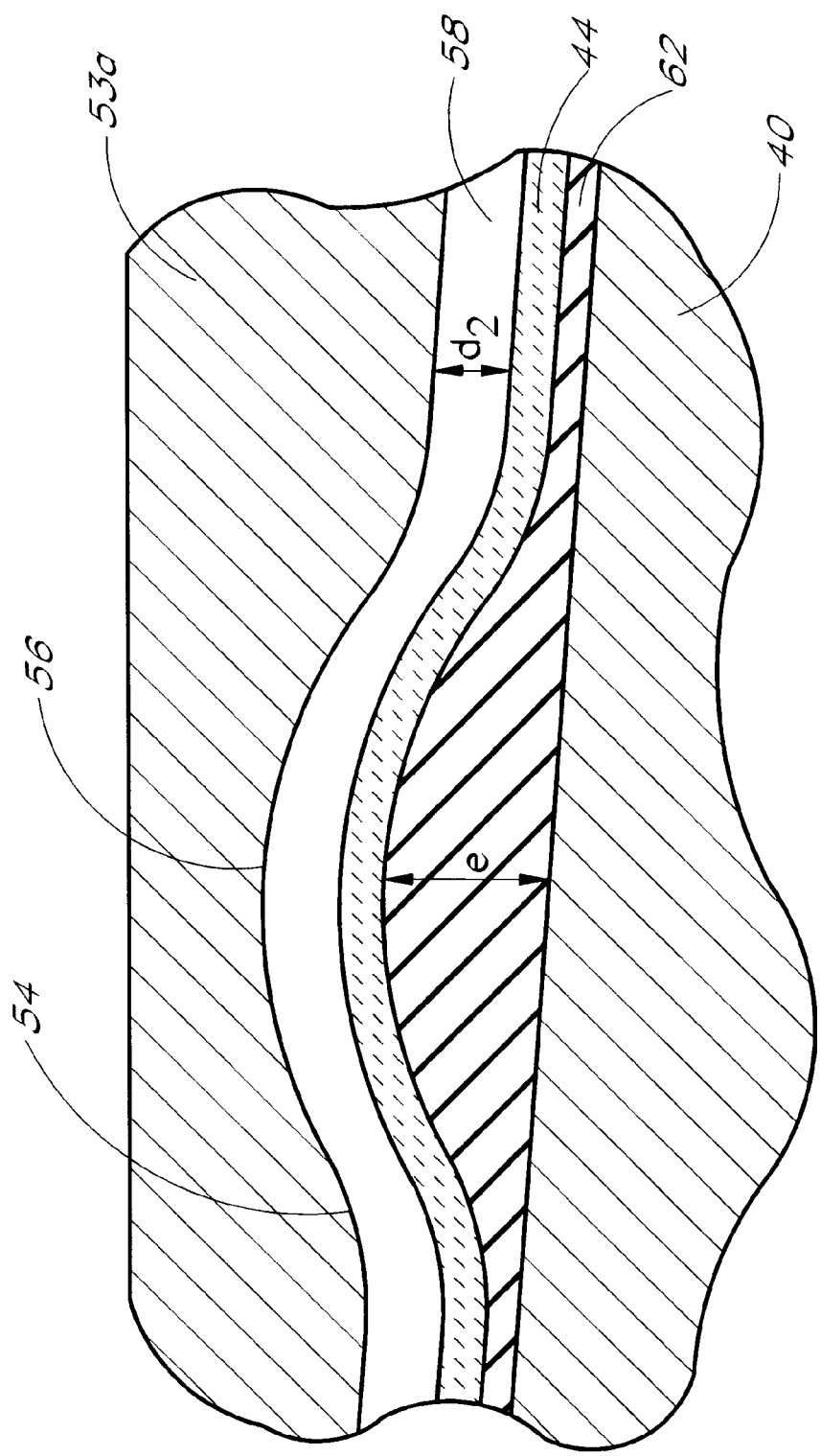
FIG. 6B is an enlarged sectional view of a portion of the molding structure illustrated in FIG. 6A.

As shown in FIG. 6B, the bladder 62 has a thickness e. In accordance with the present invention, the thickness e varies along the length of the mandrel 40. Specifically, the thickness e of the bladder 40 increases along the portion of the impression 54 that comprises the enlarged section 56. Preferably, the thickness distribution of the bladder 62 is selected such that the size $d_2$ of the gap 58 remains substantially constant along the length of the subassembly 71. This therefore eliminates the variance in the size of the gap 58 between the outer surface of the composite structure 44 and the surface of the impression 54. Hence, during the expansion step, the composite structure 44 undergoes a uniform displacement along its entire length, as described below.

Referring to FIGS. 8 and 9, in the expansion step, pressure is applied in the bladder 62, causing the bladder 62 to expand and compress the composite structure against the surface of the impression 54. During expansion, the composite structure undergoes a displacement $d_2$, corresponding to the size of the gap 58. As discussed, the gap size $d_2$ is substantially constant along the length of the composite structure 44, so that the composite structure undergoes a substantially constant displacement along its entire length.

The constant displacement along the length of the composite structure 44 preferably ensures a homogeneous displacement of the fibers in the composite structure 44 along the length of the sub-assembly 71, unlike the prior art. The fibers in the composite structure 44 therefore experience lower stretching forces during the expansion step so that the compaction process is performed more easily for an identical range of pressure as is used in the prior art. Additionally, the stretching forces applied to the fibers during the expansion step are distributed in a more constant manner along the length of the sub-assembly 71, which provides for more uniform mechanical characteristics along the entire length of the shaft.

A curing operation of the composite structure 44 is preferably conducted by heating the mold 52 at a certain temperature and for a certain amount of time. Preferably, the sub-assembly 71 is heated prior to expansion of the bladder 62 so that the resin in the composite structure 44 softens. The mold 52 is preferably heated to a temperature of approximately 145° C. to 155° C. Generally, the mold 52 is maintained at a regulated temperature which does not change during the molding cycle. The pressurization begins after a few seconds (i.e., 10 to 30 sec.) of preheating to allow the composite structure 44 to soften, but before the hardening of the composite structure 44 has started. The influence of a constant gap 58 insures that the composite structure 44 has reached a degree of softness which is equivalent all along the length of the completed shaft 22. After the preheating has been achieved, the bladder 62 is pressurized progressively (60 to 150 seconds) until it reaches a certain stable level of pressure, preferably around 12 bars. The pressure is maintained at this constant level for approximately 150 to 330 seconds. The bladder 62 is then depressurized and the heating of the composite structure 44 continues for a few seconds until almost 90% of the curing of the composite structure 44 has been achieved. At this degree of curing, the shaft 22 has hardened and can be removed from the mold 52. For example, the total curing time (heating time) of an epoxy resin is about 7 minutes. However, the cycle conditions are given more as an example and therefore can vary substantially depending on the nature of the resin. The number of times that the bladder 62 can be reused depends on various factors, including the nature of the material used and the conditions of the molding cycle (e.g., temperature and pressure).

After the molding operation, the shaft is submitted to various operations of finishing, painting, varnishing, etc. In particular, any burrs of resin located along the mold join are removed by grinding. It is appropriate to have zones of reservation for the resin to evacuate in order to eliminate the formation of air bubbles at the surface of the shaft. These zones of reservation result in burrs which are then ground during the finishing operation. The operation of painting can be followed by an operation of post-curing which consists of heating the shaft 22 at a temperature of 80 to 180° C. for about thirty (30) minutes to two (2) hours to complete the curing of the shaft 22 and release the constraints within the composite structure 44.

FIGS. 11 and 12 illustrate various embodiments of the cross-sectional configuration of the bladder 62, particularly in the legion of increased thickness. Preferably, the thickened region of the bladder 62 includes a series of small, hollow grooves 74 that extend radially outward. The grooves 74 may extend outward from the inner surface 77 of the bladder 62 (FIG. 11) or alternatively may extend inward from the outer surface 78 of the bladder 62 (FIG. 12). Advantageously, the grooves 74 maintain the shape of the bladder 62 as it expands radially outward by evenly distributing the internal pressure within the bladder 62. The distribution of the internal pressure within the bladder 62 preferably ensures that the fibers of the composite structure 44 correctly conform against the surface of the enlarged section 56 of the impression 54.

Preferably, the grooves 74 extend through the bladder 62 only in the thickened regions of the bladder to ensure a homogeneous deformation along the entire length of the bladder. The depth of the grooves 74 may decrease in size progressively from a maximum depth at the greatest area of thickness to a minimum depth at the point of minimum thickness of the bladder.

FIG. 13 illustrates a golf shaft 22a having a narrowed portion 76 along its length. The narrowed portion 76 has a diameter that gradually decreases from the diameter of the surrounding portions of the shaft 22a so that the narrowed portion bulges inward. The particular size and shape of the narrowed portion 76 may be selected to confer certain stiffness and deformation characteristics to the shaft 22a.

FIG. 14 shows a portion of a mold 52a that may be used to form the narrowed portions 76. The mold 52a has an internal projection 54a that conforms to the shape of the final shaft 22a. A portion of the internal projection 54a increases in size to form a narrowed section 80. That is, the mold 52a forms an area 80 of reduced diameter. A sub-assembly 82 is positioned within the mold 52a. The subassembly 82 includes a mandrel 40, a composite structure 44, and a bladder 84 configured in accordance with an alternative embodiment of the present invention. A gap 58 exists between the sub-assembly 82 and the surface of the projection 54a.

As shown in FIG. 14, the bladder 84 has a variable thickness. Specifically, the bladder decreases in thickness along the enlarged section 80 of the projection 54a. The decrease in thickness desirably maintains a substantially constant radial distance $d_2$ for the gap along the entire length of the sub-assembly 82. The gap between the surface of the projection 54a and the surface of the uncured composite structure is preferably maintained less than or equal to 0.7 mm. One of the objectives is to effectively ensure a minimum gap. Even a gap of 0 mm (no gap) can be envisioned in theory. In practice, however, it is preferable to provide a gap to facilitate the positioning the sub-assembly 82 in the mold and the risk of punching the fibers in the mold join, which could affect the mechanical parameters of the shaft.

In each of the embodiments of the present invention, the bladders 62 and 84 are preferably made of an elastomeric material. Any of a wide variety of elastomeric materials known to those skilled in the art may be used. In a preferred embodiment, the bladders 62 and 84 are manufactured of a silicon-based rubber material. Such a material is resistant to high temperatures and high pressures and does not adhere to the inner surface of the cured composite structure 44. This facilitates easy removal of the bladders 62 and 84 from the composite structure 44 after curing. Tests have shown that a silicone bladder may be reused between approximately ten to fifteen times. Additionally, silicone may be injection molded in order to manufacture bladders with variable cross-sectional shapes and variable wall thicknesses. If desired, release agents, such as wax or talc, may be used to facilitate easier removal of the bladder 62, particularly in the very thin areas of the bladders 62 and 84. The bladders 62 and 84 preferably each has a thickness that ranges from approximately 0.4 mm to 2 mm.

The bladder of silicone is preferably produced by injection molding. The process comprises using a female mold which has an impression of the external shape of the bladder to be produced and a mandrel which has a shape corresponding to the internal shape of the bladder. The assembly of the mandrel inside the female mold defines a cavity corresponding to the shape of the bladder to be produced. The mandrel is preferably maintained inside the female mold by means of several retractable pins which hold the mandrel at a proper distance from the impression of the female mold. Molten silicone is injected through a gate area by one end of the mold under a certain pressure. Depending on the thickness to be achieved, it may be necessary to pull a vacuum at one end and simultaneously inject the silicone molten material at the opposite end. After the injection of the material has been performed, and before hardening of the material in the mold, the pins are retracted so that the relatively softened silicone can still penetrate into the holes at the location of the pins to make an impermeable surface. The mold is cooled and the silicone bladder is removed from the mold. The resistance to heat of the silicone bladder is about 220° C. The silicone bladder does not adhere easily to the epoxy resin and therefore can be used approximately 10 to 12 times.

The bladder can also be made of a latex-based material. The latex-base bladder can be produced by dipping a template into coagulating baths and liquid latex baths. The variation of thickness in the bladder can be produced by many successive dipping operations and by using variable speeds in the descent and the ascent of the mandrel into the baths. A latex-base bladder can resist a temperature of 160° C. The applicant has observed that a latex-base bladder cannot generally be reused.

Figure 15:
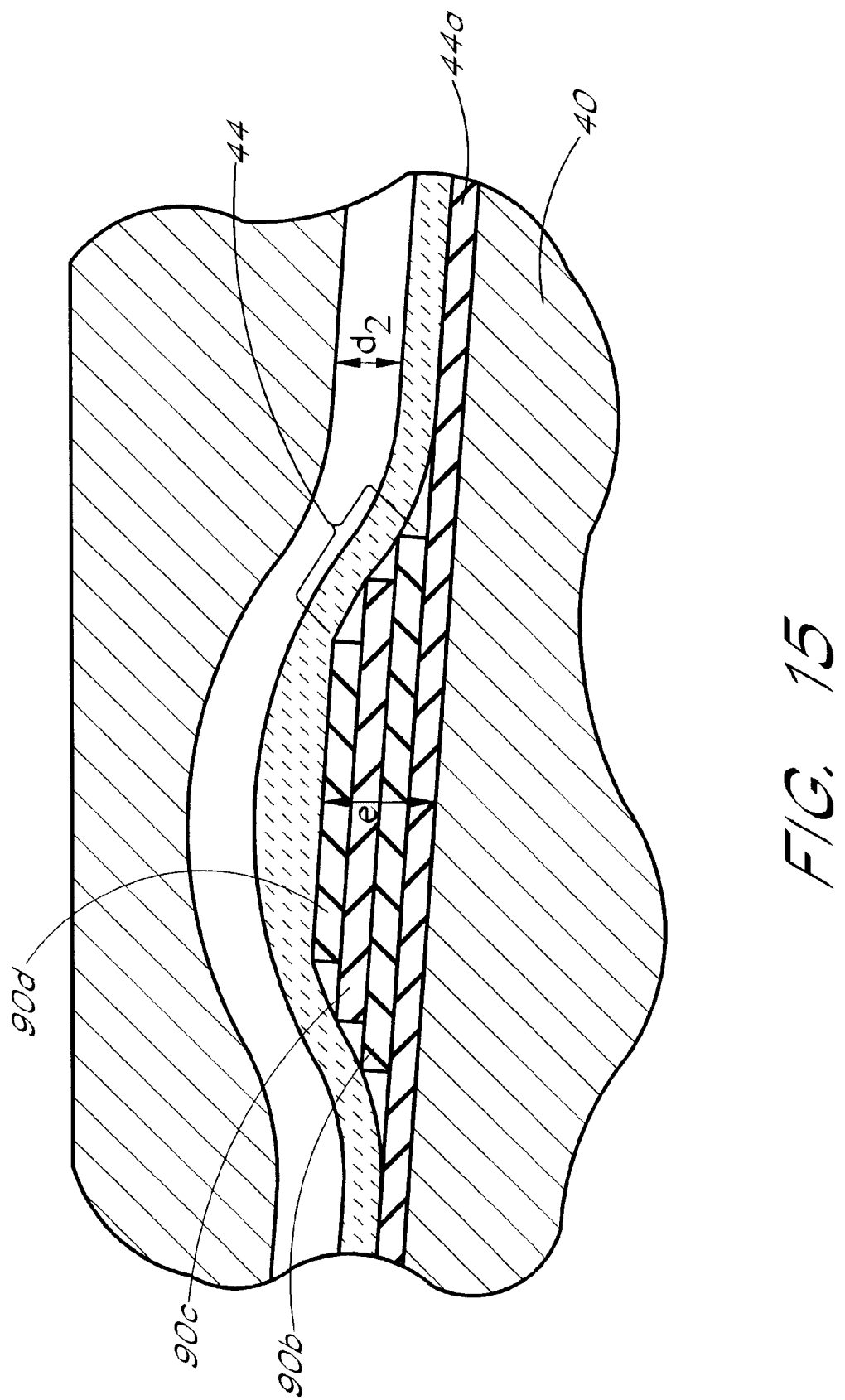
FIG. 15 is an enlarged sectional view of a portion of a molding structure according to another embodiment of the present invention.

FIG. 15 illustrates another embodiment of the bladder, referred to as bladder 90. The bladder 90 comprises a multi-layer structure including a base member of constant thickness 90a and additional layers 90b, 90c, and 90d piled thereon. The additional layers 90b, 90c, and 90d preferably function to increase the thickness e of the bladder 90 in local areas. For instance, as shown in FIG. 15, the additional layers 90b–90d are arranged to increase the bladder thickness e to form a smooth bulge section of the bladder 90. The bulge section of the bladder 90 is preferably positioned adjacent the enlarged section 56 of the mold 52. Preferably, the layers 90b–90c are positioned such that the bladder 90 has a thickness distribution that maintains a substantially constant gap size $d_1$ along the length of the mandrel 40.

In the preferred embodiment, each layer in the bladder 90 has a constant thickness along its length. As shown in FIG. 15, the thickness variation in the bladder 90 is desirably accomplished by varying the length of the layers. Hence, it will be appreciated that the number, thickness and length of each layer may vary widely depending upon the desired geometry and dimensions for the bladder 90.

Each layer 90b–90d may have a tubular shape that fits around the mandrel 40, so that the layers are concentrically arranged around the mandrel. Alternatively, the layers 90b–90d may comprise bands that are oriented longitudinally along the mandrel to form channels that extend along the length of the mandrel 40. Such channels facilitate homogeneous deformation of the bladder 90. Preferably, the layers are attached to each other using an adhesive which is resistant to elongation.

Another embodiment of the invention will be described with reference to FIGS. 16–21. Referring to FIG. 16, a sub-assembly 92 comprises a rigid mandrel 40, a bladder 96, and a composite structure 44. In this embodiment, the sub-assembly 92 further comprises an intermediate element 98 having a shape selected to vary the outer shape of the bladder 96 in a desired manner, as described below.

Figure 18:
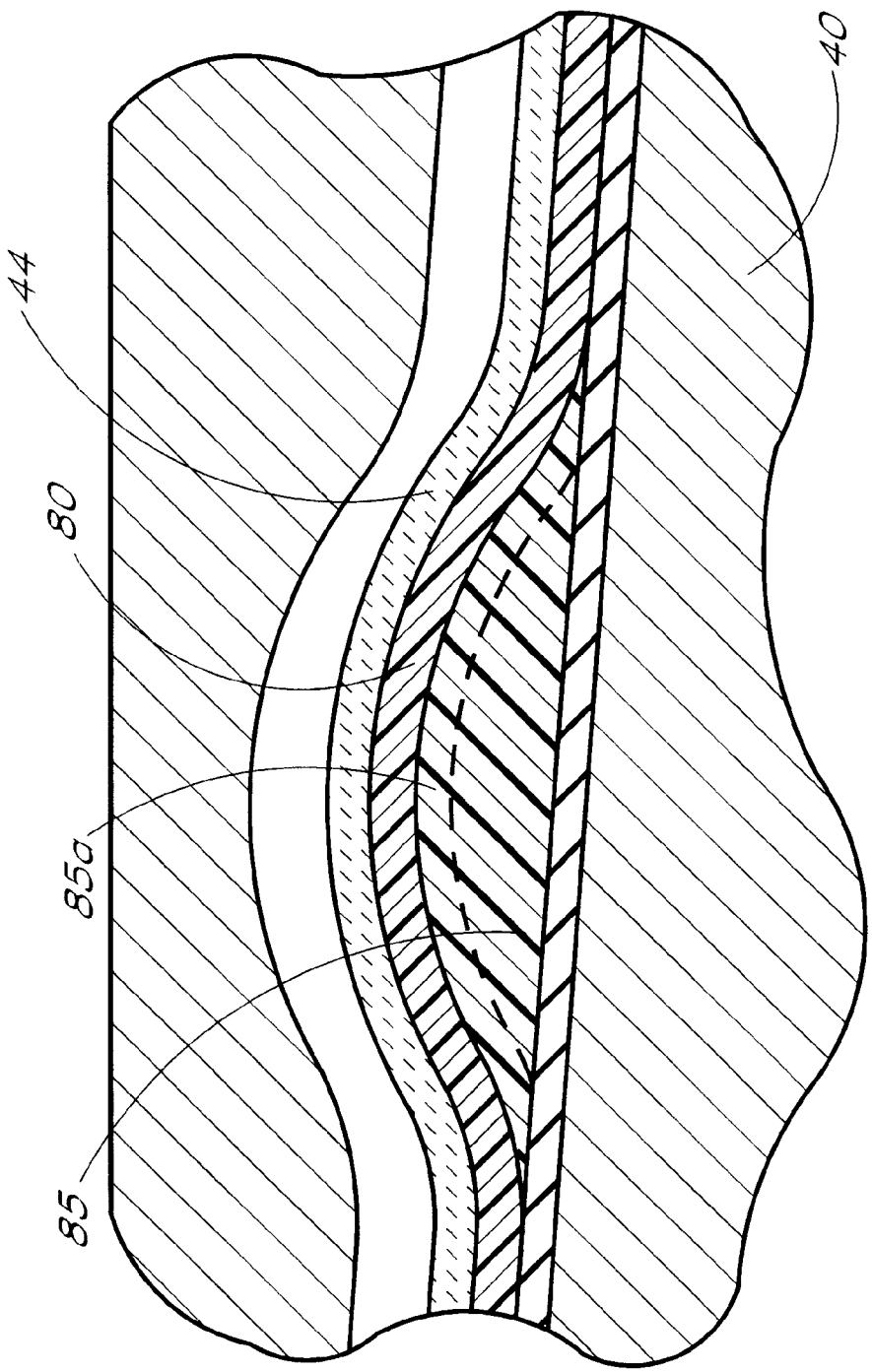
FIG. 18 is an enlarged sectional view of a portion of the molding structure of FIG. 16.

FIG. 18 is an enlarged view of the intermediate element 98. The intermediate element 98 is positioned between the mandrel 40 and the bladder 96. Preferably, the intermediate element 98 is positioned along the mandrel adjacent the enlarged region 56. As shown, the intermediate element 98 has a thickness distribution that preferably provides the intermediate element 98 with a shape that conforms to the shape of the enlarged section 56. As shown in FIG. 18, the bladder 96 and composite structure 44 conform to the shape of the intermediate element 98 so that the gap distance $d_2$ is maintained substantially constant along the entire length of the mandrel 40.

In the preferred embodiment, the bladder 96 has a constant thickness along the length of the mandrel 40. The inner surface of intermediate element 98 preferably has a shape that conforms to the outer shape of the mandrel. Preferably, the inner shape of the intermediate element 98 is sized such that the intermediate element 98 fits snug on a predetermined location on the mandrel 40, such as in the area of the enlarged section 56.

FIG. 17 is a cross-sectional view of the sub-assembly 92 taken along line 17—17 of FIG. 16. Several channels 100 extend along the intermediate element 98. The channels 100 preferably extend from one end to another end of the intermediate element 98 in order to facilitate the passage of fluid through the bladder 96. The channels 100 desirably facilitate a homogeneous distribution of internal pressure within the bladder 96, particularly within the region of the bladder 96 adjacent the enlarged section 56.

Figures 19, 20:
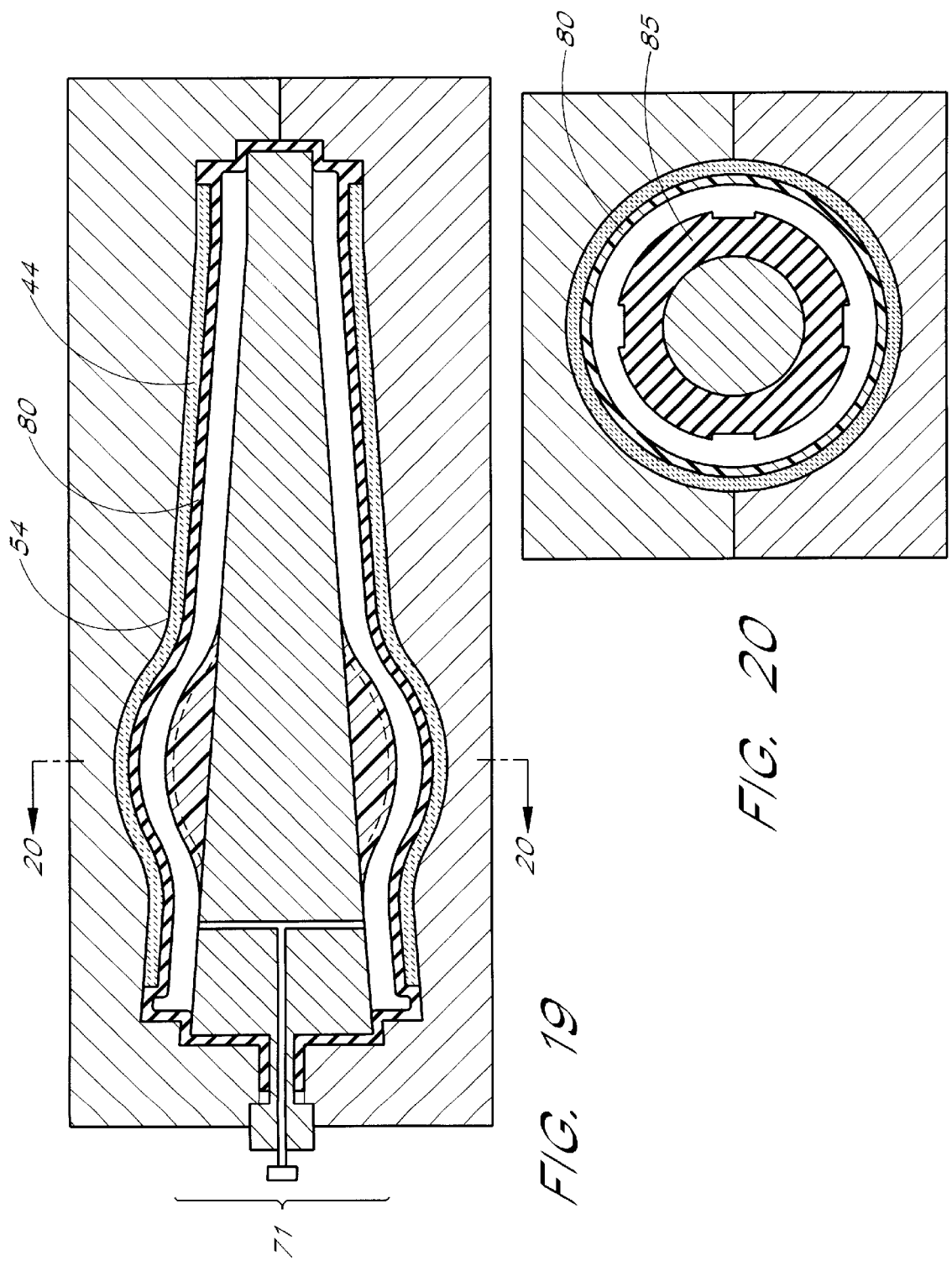
FIG. 19 is a longitudinal sectional side view of the molding operation shown in FIG. 16 after inflation of a bladder in a closed mold.
FIG. 20 is a cross-sectional view taken along 20—20 of FIG. 19.

FIGS. 19 and 20 illustrate an expansion step in which the bladder 96 is inflated by flowing an inflation media through fluid channels 37. The inflation media causes the bladder 96 to inflate and expand within the gap to compress the composite structure 44 against the inner surface of the impression 54. As shown in FIG. 19, the intermediate element 98 preferably retains its shape and remains in its initial position with respect to the mandrel 40 during the expansion step.

FIG. 20 illustrates a cross-sectional view of the sub-assembly 92 during the expansion step. As shown, the interior surface of the intermediate element 98 preferably maintains contact with the exterior surface of the mandrel 40 so that air does not circulate between the intermediate element 98 and the mandrel 40. The channels 100 that are formed on the outer surface of the intermediate element 98 facilitate air flow between the intermediate element 98 and the bladder 96 and also reduce the likelihood of air circulating between the interior surface of the intermediate element 98 and the mandrel 40.

The intermediate element 98 is preferably manufactured of a material that is resistant to stretching and particularly resistant to the stretching forces that are experienced during the expansion step. Desirably, the material used to manufacture the intermediate element 98 is also sufficiently deformable so that it may be easily extracted from the completed shaft. In one embodiment, the intermediate element 98 is manufactured of rubber or plastic having a modulus of elongation which is at least equal to, and preferably higher than, the modulus of the elongation of the material of which the bladder is manufactured. The material is desirably resistant to the high molding temperatures that are applied to the composite structure 44. In a preferred embodiment, the intermediate element 98 is manufactured of a collar of rubber, such as silicone and the like. The bladder 96 is preferably made of either silicone or of a latex-based material.

Figure 21:
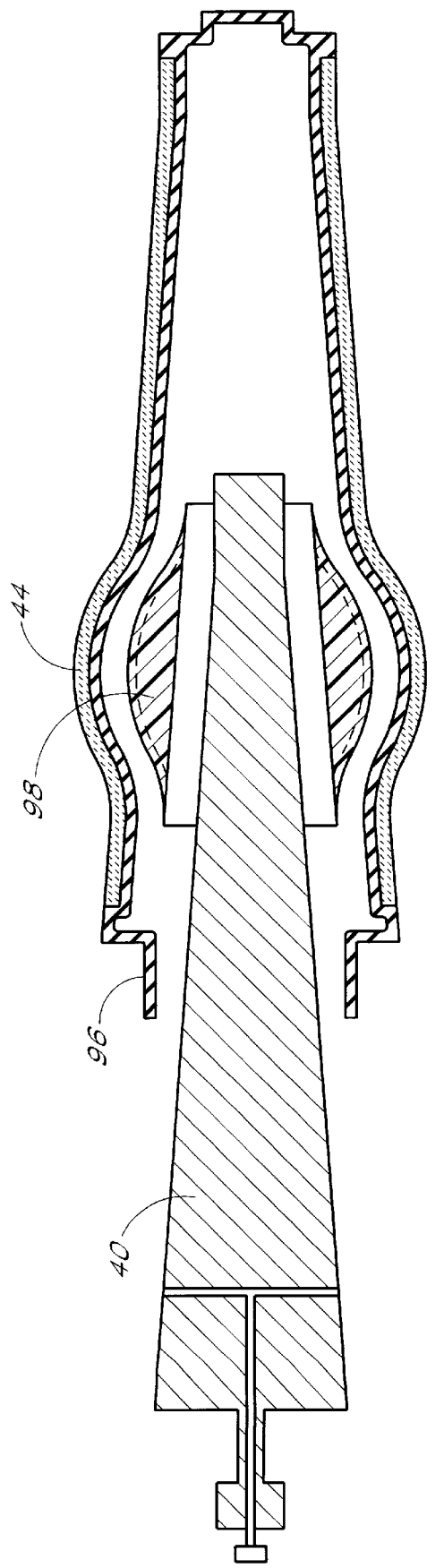
FIG. 21 is a longitudinal side view of the operation of removing a mandrel from the molded composite structure of FIGS. 19 and 20.

FIG. 21 illustrates a removal step in which the mandrel 40 is removed from the completed golf shaft. As shown, after the molding operation has been completed, the mandrel 40 is pulled from the shaft. However, the intermediate element 98 may remain in the shaft. The bladder 96 is then pulled from the shaft so that it drags the intermediate element 98 out of the shaft. As discussed, the intermediate element 98 is preferably sufficiently deformable so that it may be easily pulled out of shafts having reduced inner diameters.

One advantage associated with the intermediate element 98 is that it may be used in combination with bladders of standard shape to thereby vary the shape of such bladders. That is, an intermediate element 98 of desired shape may be placed within a bladder so that the bladder conforms to that shape. This eliminate the need to vary the shape through varying the thickness of the bladder. It will be appreciated that a plurality of intermediate elements 98 may be positioned at various locations along the mandrel 40 so as to ensure a substantially constant gap size where the mold impression has multiple enlarged sections 56.

Figure 24:
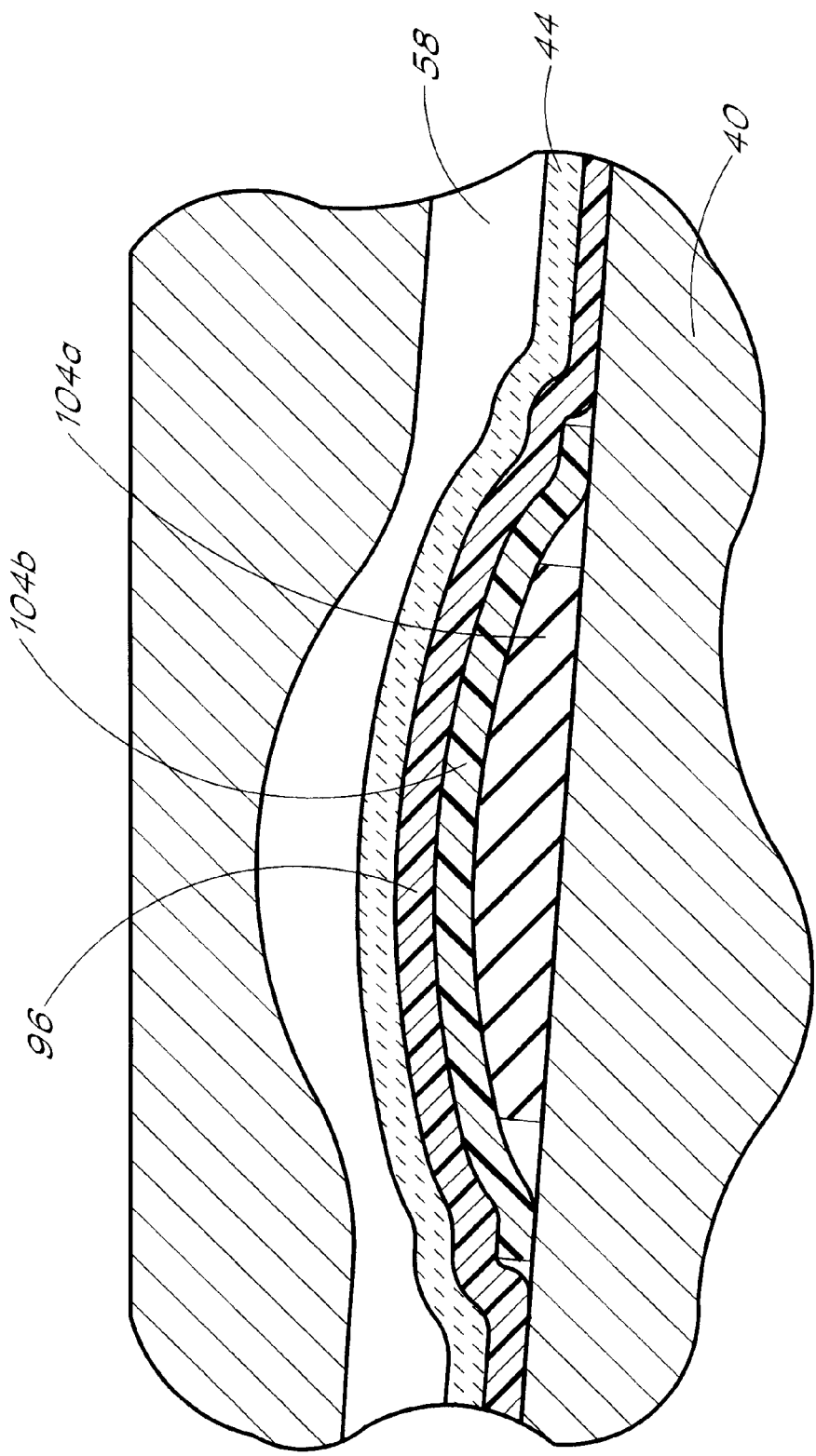
FIG. 24 is an enlarged sectional view of a portion of the molding structure of FIG. 22.

FIGS. 22–25 illustrate an intermediate element 104 that is comprised of a plurality of separate pieces. Referring to FIG. 22, there is shown a side longitudinal view of a subassembly comprising a mandrel 40, a bladder 96 and the intermediate element 104. As best shown in FIG. 24, the intermediate element 104 comprises an inner member 104a and a surrounding outer member 104b. The inner member 104a is preferably tube shaped and has an inner surface that conforms to the outer surface of the mandrel 40. The outer member 104b preferably comprises a plurality of bands which are spaced apart radially around the outer surface of the inner member 104a and extend in the longitudinal direction of the mandrel 40.

FIG. 23 is a cross-sectional view of the intermediate element 104. As shown, the outer elements 104b define channels 106 that extend lengthwise along the intermediate element 104. The channels 106 are elongated cavities between the inner element 104a and the composite structure 44. The channels 106 preferably facilitate the flow of air through the bladder 96, as described above with respect to the previous embodiment.

The inner member 104a is preferably manufactured of rubber or plastic. The bands that make up the outer member 104b may be made of any combination of materials, preferably chosen among rubber, plastic, and metal. The material is preferably deformable to facilitate removal of the intermediate member 104 from the completed shaft. Therefore, at least one of the inner member 104a or the outer member 104b is preferably made of material which is easily deformed or bent. For example, the inner member 104a may be made of a Relatively hard but deformable rubber piece, and the outer member 104b may be made of an aluminum foil having a thickness in the range of 0.5 to 2.0 mm.

Figure 25:
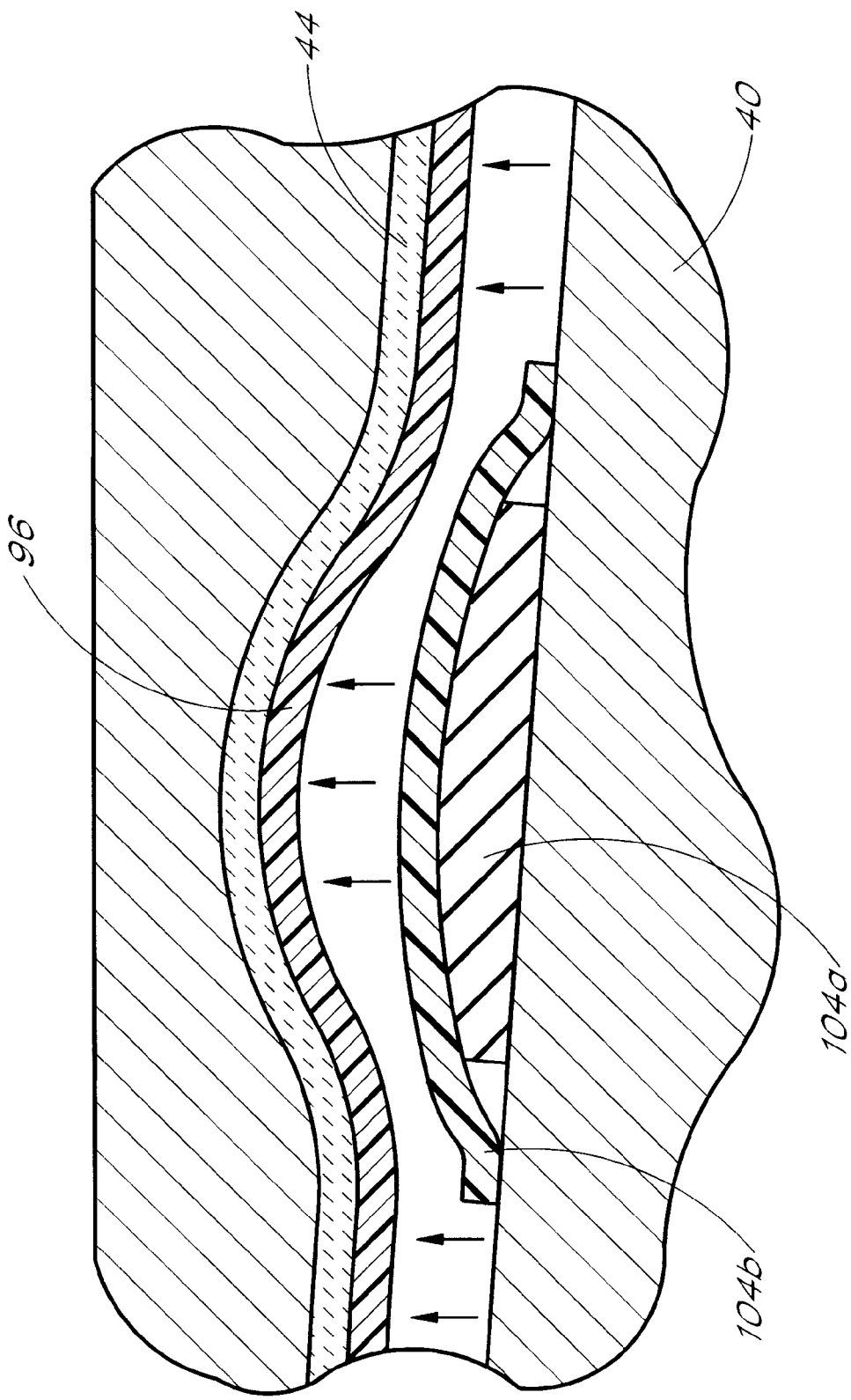
FIG. 25 is an enlarged sectional view of a portion of the molding structure after inflation of a bladder in a closed mold of the embodiment shown in FIG. 22.

FIG. 25 illustrates an expansion step using the intermediate element 104. As shown, the bladder 96 is inflated so that it expands within the gap 58 (FIG. 24). Preferably, the intermediate element 104 does not expand, but rather remains substantially adjacent the outer surface of the mandrel 40.

Figure 26:
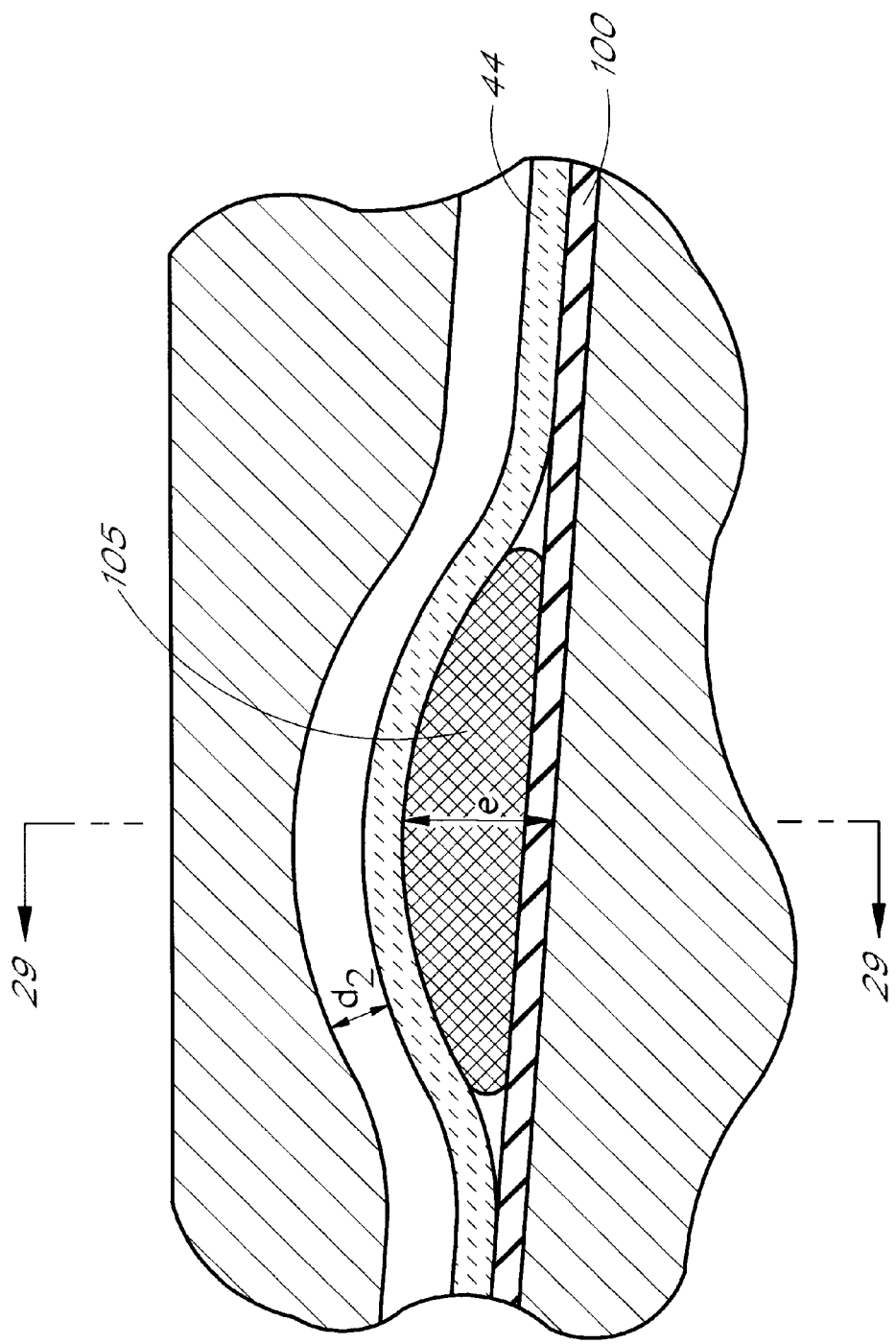
FIG. 26 is an enlarged sectional view of a portion of the molding structure during the positioning of the uncured composite structure within the mold in accordance with yet another embodiment of the invention.
Figure 27:
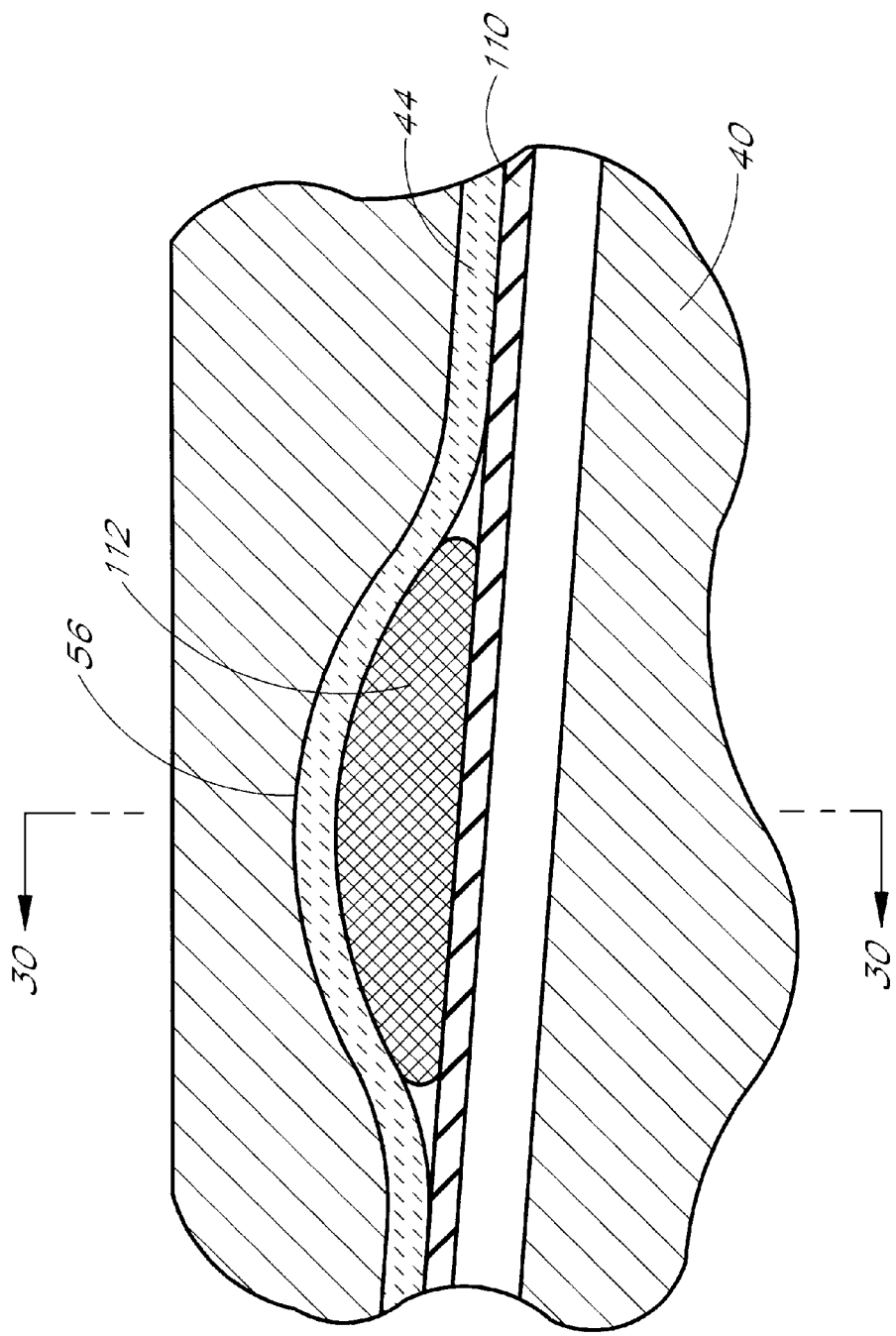
FIG. 27 is an enlarged sectional view of a portion of the molding structure after inflation of a bladder in a closed mold of the embodiment of FIG. 26.

FIGS. 26–28 illustrate yet another embodiment of the present invention. Referring to FIG. 26, a bladder 110 of constant thickness is positioned around a mandrel 40, as described above with respect to the previous embodiments. An insert member 112 is interposed between the outer surface of the bladder 110 and the inner layer of the composite structure 44. The insert member 112 has a variable thickness so that it raises the composite structure 44 with respect to the mandrel 40. Preferably, the insert member 112 has a shape that maintains the size $d_2$ of the gap substantially constant along the entire length of the mandrel 40.

FIG. 27 illustrates an expansion step using the insert member 112. As discussed above, the bladder 110 is inflated and expands within the gap to compress the composite structure 44 between the bladder 110 and the inner surface of the impression 54. In the enlarged region 56, the bladder 110 compresses the composite structure 44 between the outer surface of the insert member 112 and the surface of the enlarged region 56. As shown, the shape of the insert member 112 conforms to the shape of the enlarged section 56 so that the composite structure 44 maintains a substantially constant thickness along its entire length.

Preferably, after the molding process is complete, the insert member 112 remains attached to the inner surface of the composite structure 44. FIG. 28 is a cross-sectional view of a completed shaft. As shown the insert member 112 remains permanently attached to the inner surface of the bulged section of the shaft.

The insert member 112 is preferably made of a material which is resistant to compression and crushing. Examples of suitable materials are cork, solid plastic, rubber, foam, honeycomb, etc. In one embodiment, the insert member 112 is manufactured of a material that provides a damping effect on the shaft when the shaft is used to strike a golf ball. Cork or other damping material is highly suitable to provide such an effect. Cork has the advantage of a very low density so that the insert member 112 would not add a great amount of weight to the final shaft. An example of a suitable foam material for the insert member 112 is Rohacell®.

Referring to FIG. 29, the insert member 112 may comprise a ply of material that is rolled around the bladder 110. As shown in FIG. 29, the ply forms multiple layers that are successively rolled around the bladder 110. A complete revolution of the ply material around the bladder 110 is defined as a turn. The composite structure 44 is then laid around the insert member 112. The ply desirably has a thickness between 0.1 to 1.5 mm. It will be appreciated that a turn of composite material may be interposed in an overlap relationship between two turns of the insert member 112, depending upon the method of preparation and rolling of the laminate.

Figure 30:
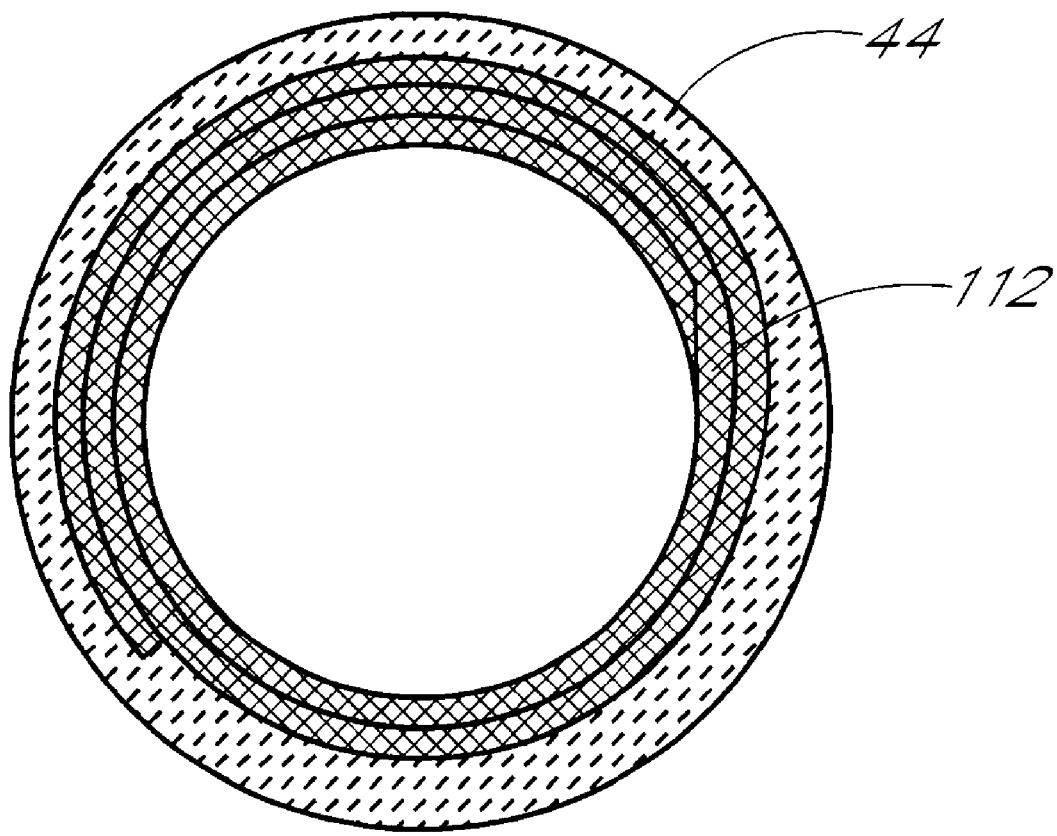
FIG. 30 is a cross-sectional view taken along 30—30 of FIG. 27 after the bladder has been removed.

If the ply forms more than a single turn, it can be superficially impregnated with the same resin as the composite structure 44 that cures during the molding step. This preferably helps the material adhere to the interior of the composite structure 44. If the ply has only a single turn, the resin of the adjacent layer of the composite structure may adhesively secure the insert member 112 to the interior surface of the shaft. FIG. 30 shows a cross-sectional view of the shaft after the bladder has been removed. As shown, the shaft comprises the composite structure 44 and the insert member 112 which is positioned adjacent the interior surface of the composite structure 44.

Any of a wide variety of materials known to those skilled in the art may be used to manufacture the composite structure 44. In a preferred embodiment, the composite structure 44 is manufactured of carbon fibers preimpregnated with epoxy resin. This material is advantageous in that it provides a high strength-to-weight ratio, in contrast with other fibrous material such as glass, for example. Those skilled in the art will appreciate that various other small amounts of fibrous materials could be used, such as glass, and aramid, in combination with carbon.

In a preferred embodiment, the fiber material is composed of several preimpregnated unidirectional fiber sheets which are wrapped around the bladder. The unidirectional sheets are arranged in layers having a fiber orientation that may be varied to achieve desired bending and torque stiffness. Generally, some sheets will have fibers oriented parallel to the axis of the completed shaft in order to confer bending strength to the golf shaft. Additional sheets may have fibers oriented at approximately 45° with respect to the shaft axis to confer torque strength to the shaft Other types of fiber sheets can also be used, alone or in combination with the unidirectional fiber sheets. Cloths of woven bidirectional fibers may also be used.

The disclosed method and apparatus may be used to manufacture golf club shafts having complex shapes, such as where the shaft has local enlarged or narrowed portions. During the molding process, the variable thickness of the bladder maintains a constant gap distance between the uncured composite structure and the internal wall of the mold. This reduces the expansion that the composite structure must undergo and also maintains a constant expansion distance along the entire length of the composite structure. The disclosed method thus produces a golf club shaft having uniform mechanical properties along its entire length. Moreover, the method simplifies tooling in that a single mandrel may be used to produce a shafts of various shapes by simply varying the thickness of the bladder.

Although the foregoing description of the preferred embodiment of the preferred invention has shown, described, and pointed out certain novel features of the invention, it will be understood that various omissions, substitutions, and changes in the form of the detail of the apparatus as illustrated as well as the uses thereof, may be made by those skilled in the art without departing from the spirit of the present invention. Consequently, the scope of the present invention should not be limited by the foregoing discussion, which is intended to illustrate rather than limit the scope of the invention.

What is claimed is:

1. A method of forming a golf club shaft, comprising:
   arranging a bladder having a localized area of nonconstant thickness along its length around a mandrel having a globally tapered configuration;
   wrapping around said bladder a preimpregnated fiber reinforced resin material having a substantially uniform thickness to form an uncured rolled composite structure;
   positioning said uncured composite structure in a female mold defining a shape which incorporates at least a local portion along its length forming one of a projection and a recess so that said material and said female mold form a gap therebetween, said uncured composite structure being positioned radially inward from said local portion forming said one of a projection and a recess, said gap having a substantially constant radial size along the entire length of the composite structure;
   pressurizing the bladder to expand said material across said gap along said entire length, to take the shape of the female mold; and
   curing the resin of said material to form said golf shaft having a final shape corresponding to said shape of the female mold.

2. A method of manufacturing a golf club shaft having an irregular final shape, comprising the steps of:
   preparing a sub-assembly comprising:
      arranging a deformable intermediate element of variable thickness around a local region of a mandrel having a globally tapered configuration;
      arranging a bladder around said mandrel to cover entirely said mandrel and further cover said intermediate element;
      wrapping around said bladder a preimpregnated fiber reinforced resin material having a substantially uniform thickness to form an uncured rolled composite structure;
   positioning said sub-assembly with said uncured composite structure in a female mold defining a shape which incorporates a local portion along its length forming a recess so that the intermediate element is located substantially along said local portion to ensure the uncured composite structure and the female mold form a gap therebetween;
   pressurizing the bladder to expand said composite structure through said gap so that said composite structure displaces a substantially constant radial distance along the entire length of the composite structure to take the shape of the female mold;
   curing the resin of said material to form said golf club shaft having said irregular final shape.

3. A method of forming a golf club shaft having an irregular final shape, comprising:
   arranging a structure including an elongated inflatable bladder around a mandrel, said structure having a localized area of nonconstant thickness along its length
   positioning an uncured fiber reinforced plastic material around said bladder so that said material generally conforms to the external shape of said bladder;
   positioning said structure and said material in a female mold which defines a negative of an irregularly shaped golf club shaft such that a gap is formed between said mold and said material, said gap having a substantially constant radial size along the entire length of the material;
   forcing said material across said gap against said female mold along said entire length to form said golf shaft having an irregular shape; and curing said golf shaft having said irregular final shape.

4. The method of claim 1, further comprising positioning said uncured composite structure in said female mold such that said radial gap is less than or equal to 0.7 mm along substantially the entire length of said material.

5. The method of claim 1, wherein pressurizing the bladder comprises forcing pressurized fluid into said bladder through a fluid conduit that communicates with the bladder.

6. The method of claim 1, further comprising depressurizing said bladder and axially removing said golf club shaft from said bladder.

7. The method of claim 2, wherein pressurizing the bladder to expand said composite structure through said radial gap comprises displacing the composite structure a radial distance of 0.7 mm or less.

8. The method of claim 2, further comprising depressurizing said bladder and axially removing said golf club shaft from said bladder.

9. The method of claim 3, wherein forcing said material across said gap against said female mold along said entire length comprises inflating said bladder to displace said material across said gap.

10. The method of claim 9, wherein forcing said material across said gap against said female mold along said entire length comprises inflating said bladder to displace said material across said gap a radial distance no greater than 0.7 mm.

* * * * *